(12) United States Patent
Nguyen et al.

(10) Patent No.: US 7,853,900 B2
(45) Date of Patent: Dec. 14, 2010

(54) ANIMATIONS

(75) Inventors: Laurent An Minh Nguyen, Los Altos, CA (US); Mitchell A. Yawitz, Belmont, CA (US)

(73) Assignee: Amazon Technologies, Inc., Reno, NV (US)

( * ) Notice: Subject to any disclaimer, the term of this patent is extended or adjusted under 35 U.S.C. 154(b) by 791 days.

(21) Appl. No.: 11/763,343

(22) Filed: Jun. 14, 2007

(65) Prior Publication Data

US 2008/0295039 A1 Nov. 27, 2008

Related U.S. Application Data

(60) Provisional application No. 60/939,357, filed on May 21, 2007.

(51) Int. Cl.
*G06F 3/048* (2006.01)

(52) U.S. Cl. .................. 715/861; 715/858; 715/808; 715/786; 715/833; 715/804; 715/784; 715/787; 715/856

(58) Field of Classification Search .......... 715/858, 715/808, 861, 786, 833, 804, 784, 787; 345/184
See application file for complete search history.

(56) References Cited

U.S. PATENT DOCUMENTS

| 5,339,391 | A | * | 8/1994 | Wroblewski et al. ........ 345/607 |
| 5,553,225 | A | * | 9/1996 | Perry .......................... 715/786 |
| 5,566,098 | A | | 10/1996 | Lucente et al. |
| 5,663,748 | A | | 9/1997 | Huffman et al. |
| 5,710,922 | A | | 1/1998 | Alley et al. |
| 5,761,485 | A | | 6/1998 | Munyan |
| 5,765,168 | A | | 6/1998 | Burrows |
| 5,784,056 | A | * | 7/1998 | Nielsen ....................... 715/856 |
| 5,801,698 | A | * | 9/1998 | Lection et al. .............. 715/861 |
| 5,847,698 | A | | 12/1998 | Reavey et al. |
| 5,892,900 | A | | 4/1999 | Ginter et al. |
| 5,898,432 | A | * | 4/1999 | Pinard ......................... 715/861 |
| 5,900,872 | A | * | 5/1999 | Ashe ........................... 715/786 |

(Continued)

FOREIGN PATENT DOCUMENTS

WO    WO9720274    6/1997

(Continued)

OTHER PUBLICATIONS

Solaris User Guide, 1994, Sun Microsystems, 481-508.*

(Continued)

*Primary Examiner*—Tadeese Hailu
*Assistant Examiner*—Nicholas S Ulrich
(74) *Attorney, Agent, or Firm*—Lee & Hayes, PLLC

(57) ABSTRACT

Animations enhance viewing and consumption of electronic items that are presented to a user on a screen of a computing device. These animations may occur in response to receiving an instruction to move a position of a cursor displayed on the screen of the computing device. A user may trigger this instruction, for instance, by selecting a portion of the electronic content with use of the cursor. In response to the selection, the cursor or some other entity may undergo some form of animation. This animation may notify the user that the selection is being processed, and may also indicate a future position of the cursor at a time after the selection is processed.

26 Claims, 22 Drawing Sheets

U.S. PATENT DOCUMENTS

| | | | |
|---|---|---|---|
| 5,956,048 | A | 9/1999 | Gaston |
| 5,960,411 | A | 9/1999 | Hartman et al. |
| 5,977,933 | A * | 11/1999 | Wicher et al. .............. 345/3.1 |
| 6,047,189 | A | 4/2000 | Yun et al. |
| 6,097,390 | A * | 8/2000 | Marks .................. 715/772 |
| 6,204,846 | B1 * | 3/2001 | Little et al. ............... 715/784 |
| 6,313,828 | B1 | 11/2001 | Chombo |
| 6,331,867 | B1 | 12/2001 | Eberhard et al. |
| 6,351,750 | B1 | 2/2002 | Duga et al. |
| 6,385,596 | B1 | 5/2002 | Wiser et al. |
| 6,449,627 | B1 | 9/2002 | Baer et al. |
| 6,529,920 | B1 | 3/2003 | Arons et al. |
| 6,590,595 | B1 * | 7/2003 | Wagner et al. ............ 715/784 |
| D481,036 | S * | 10/2003 | Wentt ...................... D14/345 |
| 6,642,947 | B2 * | 11/2003 | Feierbach ................. 715/861 |
| 6,724,403 | B1 * | 4/2004 | Santoro et al. ............ 715/765 |
| 6,735,583 | B1 | 5/2004 | Bjarnestam et al. |
| 6,816,174 | B2 * | 11/2004 | Tiongson et al. ........... 715/787 |
| 6,844,887 | B2 * | 1/2005 | Laffey et al. ............... 715/861 |
| 6,847,966 | B1 | 1/2005 | Sommer et al. |
| 6,904,449 | B1 | 6/2005 | Quinones |
| 6,933,928 | B1 | 8/2005 | Lilienthal |
| 6,985,932 | B1 | 1/2006 | Glaser et al. |
| 7,007,015 | B1 | 2/2006 | Nayak |
| 7,009,596 | B2 | 3/2006 | Seet et al. |
| 7,020,654 | B1 | 3/2006 | Najmi |
| 7,100,119 | B2 * | 8/2006 | Keely et al. ............... 715/776 |
| 7,103,848 | B2 | 9/2006 | Barsness et al. |
| 7,143,362 | B2 * | 11/2006 | Dieberger et al. ........... 715/764 |
| 7,209,888 | B2 | 4/2007 | Frid-Nielsen et al. |
| 7,257,577 | B2 | 8/2007 | Fagin et al. |
| 7,287,068 | B1 | 10/2007 | Eriksson et al. |
| 7,296,230 | B2 * | 11/2007 | Fukatsu et al. ............. 715/711 |
| 7,298,851 | B1 | 11/2007 | Hendricks et al. |
| 7,304,635 | B2 | 12/2007 | Seet et al. |
| 7,350,704 | B2 * | 4/2008 | Barsness et al. ............ 235/435 |
| 7,355,591 | B2 | 4/2008 | Sugimoto |
| 7,401,286 | B1 | 7/2008 | Hendricks et al. |
| 7,453,437 | B2 * | 11/2008 | Inui .......................... 345/156 |
| 7,471,284 | B2 * | 12/2008 | Bathiche et al. ............. 345/184 |
| D586,803 | S * | 2/2009 | Whitehorn et al. ......... D14/346 |
| 7,506,268 | B2 * | 3/2009 | Jennings et al. ............ 715/786 |
| D591,741 | S * | 5/2009 | Whitehorn et al. ......... D14/346 |
| 2001/0007980 | A1 | 7/2001 | Ishibashi et al. |
| 2001/0037328 | A1 | 11/2001 | Pustejovsky et al. |
| 2001/0049623 | A1 | 12/2001 | Aggarwal et al. |
| 2002/0010759 | A1 | 1/2002 | Hitson et al. |
| 2002/0035697 | A1 | 3/2002 | McCurdy et al. |
| 2002/0092031 | A1 | 7/2002 | Dudkiewicz et al. |
| 2002/0103809 | A1 | 8/2002 | Starzl et al. |
| 2002/0129012 | A1 | 9/2002 | Green |
| 2002/0138291 | A1 | 9/2002 | Vaidyanathan et al. |
| 2002/0147724 | A1 | 10/2002 | Fries et al. |
| 2002/0186252 | A1 * | 12/2002 | Himmel et al. ............. 345/787 |
| 2003/0020671 | A1 * | 1/2003 | Santoro et al. ............. 345/1.3 |
| 2003/0028395 | A1 | 2/2003 | Rodgers et al. |
| 2003/0040970 | A1 | 2/2003 | Miller |
| 2003/0046233 | A1 | 3/2003 | Ara et al. |
| 2003/0069812 | A1 | 4/2003 | Yuen et al. |
| 2003/0097354 | A1 | 5/2003 | Finlay et al. |
| 2003/0110503 | A1 | 6/2003 | Perkes |
| 2003/0163399 | A1 | 8/2003 | Harper et al. |
| 2003/0164844 | A1 | 9/2003 | Kravitz et al. |
| 2003/0182551 | A1 | 9/2003 | Frantz et al. |
| 2004/0003398 | A1 | 1/2004 | Donian et al. |
| 2004/0044723 | A1 | 3/2004 | Bell et al. |
| 2004/0085364 | A1 * | 5/2004 | Keely et al. ............... 345/804 |
| 2004/0117189 | A1 | 6/2004 | Bennett |
| 2004/0139400 | A1 | 7/2004 | Allam et al. |
| 2004/0205457 | A1 | 10/2004 | Bent et al. |
| 2004/0267552 | A1 | 12/2004 | Gilliam et al. |
| 2004/0268253 | A1 | 12/2004 | DeMello et al. |
| 2005/0022113 | A1 | 1/2005 | Hanlon |
| 2005/0044148 | A1 | 2/2005 | Son et al. |
| 2005/0044224 | A1 | 2/2005 | Jun et al. |
| 2005/0088410 | A1 * | 4/2005 | Chaudhri .................. 345/157 |
| 2005/0104866 | A1 * | 5/2005 | Inui ......................... 345/173 |
| 2005/0176438 | A1 | 8/2005 | Li |
| 2005/0193330 | A1 | 9/2005 | Peters |
| 2005/0198070 | A1 | 9/2005 | Lowry |
| 2005/0222977 | A1 | 10/2005 | Zhou et al. |
| 2005/0256822 | A1 | 11/2005 | Hollingsworth |
| 2006/0020469 | A1 | 1/2006 | Rast |
| 2006/0071754 | A1 | 4/2006 | Tofts et al. |
| 2006/0075205 | A1 | 4/2006 | Martin et al. |
| 2006/0098900 | A1 | 5/2006 | King et al. |
| 2006/0129618 | A1 | 6/2006 | Maier |
| 2006/0161635 | A1 | 7/2006 | Lamkin et al. |
| 2006/0179137 | A1 | 8/2006 | Jennings, III et al. |
| 2006/0190568 | A1 | 8/2006 | Patterson |
| 2006/0256083 | A1 | 11/2006 | Rosenberg |
| 2006/0281058 | A1 | 12/2006 | Mangoaela |
| 2007/0050346 | A1 | 3/2007 | Goel et al. |
| 2007/0061335 | A1 | 3/2007 | Ramer et al. |
| 2007/0118533 | A1 | 5/2007 | Ramer et al. |
| 2007/0174545 | A1 | 7/2007 | Okada et al. |
| 2007/0219983 | A1 | 9/2007 | Fish |
| 2007/0282809 | A1 | 12/2007 | Hoeber et al. |
| 2008/0005097 | A1 | 1/2008 | Kleewein et al. |
| 2008/0082518 | A1 | 4/2008 | Loftesness |
| 2008/0133479 | A1 | 6/2008 | Zelevinsky et al. |
| 2008/0163039 | A1 | 7/2008 | Ryan et al. |
| 2008/0168073 | A1 | 7/2008 | Siegel et al. |
| 2008/0208833 | A1 | 8/2008 | Basmov |
| 2008/0243788 | A1 | 10/2008 | Reztlaff, II et al. |
| 2008/0243828 | A1 | 10/2008 | Reztlaff, II et al. |
| 2008/0293450 | A1 | 11/2008 | Ryan et al. |
| 2008/0294674 | A1 | 11/2008 | Reztlaff, II et al. |

FOREIGN PATENT DOCUMENTS

| | | |
|---|---|---|
| WO | WO0045588 | 8/2000 |
| WO | WO0239206 | 5/2002 |

OTHER PUBLICATIONS

U.S. Appl. No. 11/537,484, filed Sep. 29, 2006, Thomas Ryan, "Expedited Acquisition of a Digital Item Following a Sample Presentation of the Item."

U.S. Appl. No. 11/537,518, filed Sep. 29, 2006, John Lattyak, "Acquisition of an Item based on a Catalog Presentation of Items."

U.S. Appl. No. 11/693,685, filed Mar. 29, 2007, John Lattyak; John Kim; Steven Moy; Laurent An Minh Nguyen, "Relative Progress and Event Indicators."

U.S. Appl. No. 11/763,314, filed Jun. 14, 2007, John Lattyak; Craig Griffin; Steven Weiss, "Display Dependent Markup Language."

U.S. Appl. No. 11/763,339, filed Jun. 14, 2007, David Isbister; Marshall Willilams; Nicholas Vaccaro, "Power Management Techniques for a User Device."

U.S. Appl. No. 11/763,357, filed Jun. 14, 2007, James Reztlaff II; John Lattyak, "Obtaining and Verifying Search Indices."

U.S. Appl. No. 11/763,363, filed Jun. 14, 2007, James Reztlaff II; Thomas Ryan; "Search Results Generation and Sorting."

U.S. Appl. No. 11/763,375, filed Jun. 14, 2007, John Lattyak, Girish Bansil Bajaj, Kevin R. Cheung, Thomas Fruchterman, Robert L. Goodwin, Kenneth P. Kiraly, Richard Moore, Subram Narasimhan, Thomas A. Ryan, Michael V. Rykov, Jon Saxton, James C. Slezak, Beryl Tomay, Aviram Zagorie, Gregg Elliott Zehr, "Delivery of Items for Consumption by a User Device."

U.S. Appl. No. 11/763,376, filed Jun. 14, 2007, Kenneth Kiraly; Thomas Ryan; Gregg Zehr; John Lattyak; Michael Rykov; Girish Bansilal Bajaj; James Selzak; Aviram Zagorie; Richard Moore; Kevin Cheung; Thomas Fruchterman; Robert Goodwin, "Notification of a User Device to Perform an Action."

U.S. Appl. No. 11/763,378, filed Jun. 14, 2007, John Lattyak; Thomas Ryan; Gregg Zehr; Kenneth Kiraly; Michael Rykov; Girish Bansilal Bajaj; James Slezak; Aviram Zagorie; Richard Moore; Kevin Cheung; Thomas Fruchterman; Robert Goodwin; Xiaotian Guo, "Transfer of Instructions to a User Device."

U.S. Appl. No. 11/763,381, filed Jun. 14, 2007, Michael Rykov; Girish Bansilal Bajaj; James Slezak; Aviram Zagorie; Richard Moore; Kevin Cheung; Thomas Fruchterman; Robert Goodwin, "Selecting and Providing Items in a Media Consumption System."

U.S. Appl. No. 11/763,386, filed Jun. 14, 2007, Thomas Ryan; Gregg Zehr; Kenneth Kiraly; John Lattyak; Michael Rykov; Girish Bansilal Bajaj; James Slezak; Aviram Zagorie; Richard Moore; Kevin Cheung; Thomas Fruchterman; Robert Goodwin, "Handling of Subscription-Related Issues in a Media Consumption System."

U.S. Appl. No. 11/763,390, filed Jun. 14, 2007, Girish Bansilal Bajaj; Michael Rykov; James Slezak; Aviram Zagorie; Richard Moore; Kevin Cheung; Thomas Fruchterman; Robert Goodwin,, "Providing User-Supplied Items to a User Device."

U.S. Appl. No. 11/763,392, filed Jun. 14, 2007, Thomas Ryan; Gregg Zehr; Kenneth Kiraly; John Lattyak; Subram Narasimhan; Michael Rykov; Girish Bansilal Bajaj; James Slezak; Aviram Zagorie; Richard Moore; Kevin Cheung; Thomas Fruchterman; Robert Goodwin, "Administrative Tasks in a Media Consumption System ."

U.S. Appl. No. 11/763,393, filed Jun. 14, 2007, John Lattyak; Michael Rykov; Girish Bansilal Bajaj; James Slezak; Aviram Zagorie; Richard Moore; Kevin Cheung; Thomas Fruchterman; Robert Goodwin "Incremental Updates of Items ."

U.S. Appl. No. 11/763,395, filed Jun. 14, 2007, Thomas Ryan; Gregg Zehr; Kenneth Kiraly; John Lattyak; Michael Rykov; Girish Bansilal Bajaj; James Slezak; Aviram Zagorie; Richard Moore; Kevin Cheung; Thomas Fruchterman; Robert Goodwin; James Reztlaff II, "Providing Supplemental Information Based on Hints in a Media Consumption System ."

U.S. Appl. No. 11/963,618, filed Dec. 21, 2007, Michael Rykov; Laurent An Minh Nguyen; Steven Moy, "Dissemination of Periodical Samples."

U.S. Appl. No. 12/333,215, filed Dec. 11, 2008, Aviram Zagorie; Craig Griffin; John Lattyak; Michael Rykov, "Device-Specific Presentation Control for Electronic Book Reader Devices."

U.S. Appl. No. 12/351,629, filed Jan. 9, 2009, John Johnston; Weiping Dou; Steven Chase, "Antenna Placement on Portable Device ."

U.S. Appl. No. 12/351,663, filed Jan. 9, 2009, Chris Li; Steven Chase, "Surface Mount Clip for Routing and Grounding Cables."

Cleveland, Jr. et al., "Questions and Answers about Biological Effects and Potential Hazards of Radiofrequency Electromagnetic Fields" OET Bulletin 56, Fourth Edition, Aug. 1999, 38 pages.

Cleveland, Jr., et al, "Evaluating Compliance with FCC Guidelines for Human Exposure to Radiofrequency Electromagnetic Fields" OET Bulletin 65, Edition 97-01, Aug. 1997, 84 pages.

Means, et al., " Evaluating Compliance with FCC Guidelines for Human Exposure to Radiofrequency Electromagnetic Fields", OET Bulletin 65 Edition 97-01, Jun. 2001, 57 pages.

OQO "A Full PC That Fits in Your Pocket" Retrieved on Sep. 22, 2008 at <<http://www.oqo.com/support/documentation.html>>.

PCT Search Report for International Application No. PCT/US 08/57848, mailed Jul. 7, 2008 (9 pages).

PCT Search Report for International Application No. PCT/US 08/64387, mailed Sep. 9, 2008 (2 pages).

U.S. Appl. No. 12/360,089, filed Jan. 26, 2009, Thomas Dimson, Janna Hamaker, Eugene Kalenkovich, Tom Killalea, "Aggregation of Highlights."

U.S. Appl. No. 12/360,744, filed Jan. 27, 2009, Rajiv Kotesh Ghanta; Marcos Frid; Joseph J. Hebenstreit; John T. Kim, "Electronic Device With Haptic Feedback."

U.S. Appl. No. 12/366,941, filed Feb. 6, 2009, Scott Dixon; Eriel Thomas, "Bundled Digital Content."

U.S. Appl. No. 12/414,914, filed Mar. 31, 2009, Amit Agarwal, Zaur Kambarov; Tom Killalea, "Questions on Highlighted Passages."

U.S. Appl. No. 29/331,528, filed Jan. 27, 2009, Chris Green, "User Interface Cluster."

U.S. Appl. No. 11/277,894, filed Mar. 29, 2006, Jateen P. Parekh, Gregg E. Zehr, and Subram Narasimhan,"Reader Device Content Indexing".

Bradley, "Plastic Shape Shifter", retreived on May 7, 2009 at <<http://www.reactivereports.com/61/61_3.html>>, Chemistry WebMagazine, Issue No. 61, Dec. 2006, 2 pgs.

Cavanaugh "EBooks and Accommodations", Teaching Expectional Children vol. 35 No. 2 pp. 56-61 Copyright 2002 CEC, pp. 56-61.

Chi et al. "eBooks with Indexes that Reorganize Conceptually", CHI2004, Apr. 24-29, 2004, Vienna, Austria ACM 1-58113-703-6/04/0004, pp. 1223-1226.

Davison et al. "The Use of eBooks and Interactive Multimedia, as Alternative Forms of Technical Documentation" SIGDOC'05, Sep. 21-23, 2005, Conventry, United Kingdom, Copyright 2005 ACM 1-59593-175-9/5/0009, pp. 108-115.

Elspass, et al., "Portable Haptic Interface with Active Functional Design", In Proceedings SPIE Conference on Smart Structures and Integrated Systems, Newport Beach, California, vol. 3668, Mar. 1999, 926-932.

"Haptic History—Machine Haptics (Expansion)" retrieved on May 7, 2009 at <<http://hapticshistory.chc61.uci.cu/haptic/site/pages/Machine-Haptics-Became_5.php.>> from Google's cache, text-only version as webpage appeared on Apr. 16, 2009, 8 pgs.

Jones, et al., "Development of a Tactile Vest", IEEE Computer Society, In the Proceedings of the 12th International Symposium on Haptic Interfaces for Virtual Environment and Teleoperator Systems, Mar. 27-28, 2004, pp. 82-89.

Leutwyler, "Shape-shifting Polymer Gels", retrieved on May 7, 2009 at <<http://www.scientificamerican.com/article.cfm?id=shape-shifting-polymer-ge&print=true>>, Scientific American, Nov. 9, 2000, 1 pg.

Nakatani, et al., "3D Form Display with Shape Memory Alloy", in Proceedings of 13th International Conference on Artificial Reality and Teleexistence (ICAT), 2003, pp. 179-184.

"Shape Memory Polymer", retrieved on May 7, 2009 at <<http://en.wikipedia.org/wiki/Shape_Memory_Polymer>>, Wikipedia, 8 pgs.

Sohn et al. "Development of a Standard Format for eBooks", SAC2002, Madrid, Spain, 2002 ACM 1-58113-445-2/02/0, pp. 535-540.

Wellman, et al., "Mechanical Design and Control of a High-Bandwidth Shape Memory Alloy Tactile Display", Springer-Verlag, in the Proceedings of the International Symposium on Experimental Robotics, Barcelona, Spain, Jun. 1997, pp. 56-66, 12 pgs.

Yoshikawa, et al., "Vertical Drive Micro Actuator for Haptic Display Using Shape Memory Alloy Thin Film", IEE Japan, Papers of Technical Meeting on Micromachine and Sensor System, Journal Code L2898B, vol. MSS-05, No. 21-44, 2005, pp. 103-108.

Cafesoft.com, "Security Glossary", dated Oct. 13, 2003, retrieved from the Wayback Machine on Jul. 2, 2009 at <<http://web.archive.org/web/20031013022218/http://cafesoft.com/support/security-glossary.html>>, 6 pages.

PCT Search Report from International Application No. PCT/US08/57829, mailed on Aug. 15, 2008, 2 pages.

PCT Search Report from International Application No. PCT/US08/64368, mailed on Sep. 22, 2008, 2 pages.

PCT Search Report from International Application No. PCT/US07/89105, mailed on Aug. 18, 2008, 4 pages.

PCT Search Report from International Application No. PCT/US08/57871, mailed on Nov. 3, 2008, 4 pages.

\* cited by examiner

ANIMATIONS

RELATED APPLICATION(S)

This application claims the benefit of U.S. Provisional Application No. 60/939,357 filed on May 21, 2007, which is incorporated by reference herein in its entirety.

BACKGROUND

Users have traditionally consumed media items (such as books, magazines, newspapers, etc.) in hard-copy form. For instance, a user may obtain a physical book from a bookstore or a library. The user can read the book by manually flipping through its pages in conventional fashion.

A user may now also receive and consume some media items in electronic form. In one case, a user may use a personal computer to connect to a network-accessible source of media items via a conventional telephone or cable modem. The user may then download a document from this source. The user may consume the document by printing it out and reading it in conventional fashion. Alternatively, the user may read the document in electronic form, that is, by reading the book as presented on a computer monitor. When the user reads the book in electronic form, the user typically must wait for the computer monitor to render the book's pages as the user reads the book.

A provider of electronic media items faces various challenges, as many users continue to prefer consuming media items in traditional form. The provider confronts the task of capturing the interest of such users, while providing a solution that is viable from a technical standpoint and a business-related standpoint. For instance, the provider faces the challenge of rendering the book's pages in an efficient manner that does cause the user to lose interest in the media item.

BRIEF DESCRIPTION OF THE DRAWINGS

Animations enhance viewing and consumption of electronic items that are presented to a user on a screen of a computing device. These animations may occur in response to receiving an instruction to move a position of a cursor displayed on the screen of the computing device. A user may trigger this instruction, for instance, by selecting a portion of the electronic content with use of the cursor. In response to the selection, the cursor or some other entity may undergo some form of animation. This animation may notify the user that the selection is being processed, and may also indicate a future position of the cursor at a time after the selection is processed.

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure is directed to animations, which enhance a user's experience when viewing and consuming electronic items. In some instances, these animations may occur in response to a request to perform an operation upon presented electronic content. In other instances, animations occur in response to receiving an instruction to move a position of a displayed cursor. This instruction may be triggered by a user or by a device upon which the electronic item is displayed. For instance, a user may select a portion of displayed content with a cursor. This selection may trigger an instruction to move a position of the cursor. The movement of the cursor or action by some other entity may then result in some form of animation. The displayed content may also be altered to reflect the user's selection.

For instance, the user may select a link (e.g., a Uniform Resource Location (URL)) within the displayed content. While the device loads content associated with the link, the cursor may perform the animation. This animation may notify the user that the selection is being processed. In some instances, this animation may also indicate to the user a future location of the cursor once the displayed content is altered (e.g., after the content associated with the URL is loaded).

For purposes of discussion, these animations are described in the context of an electronic-book reader. While various implementations of this environment are provided herein below, it should be appreciated that the described techniques may be implemented in other environments.

Figure 1:
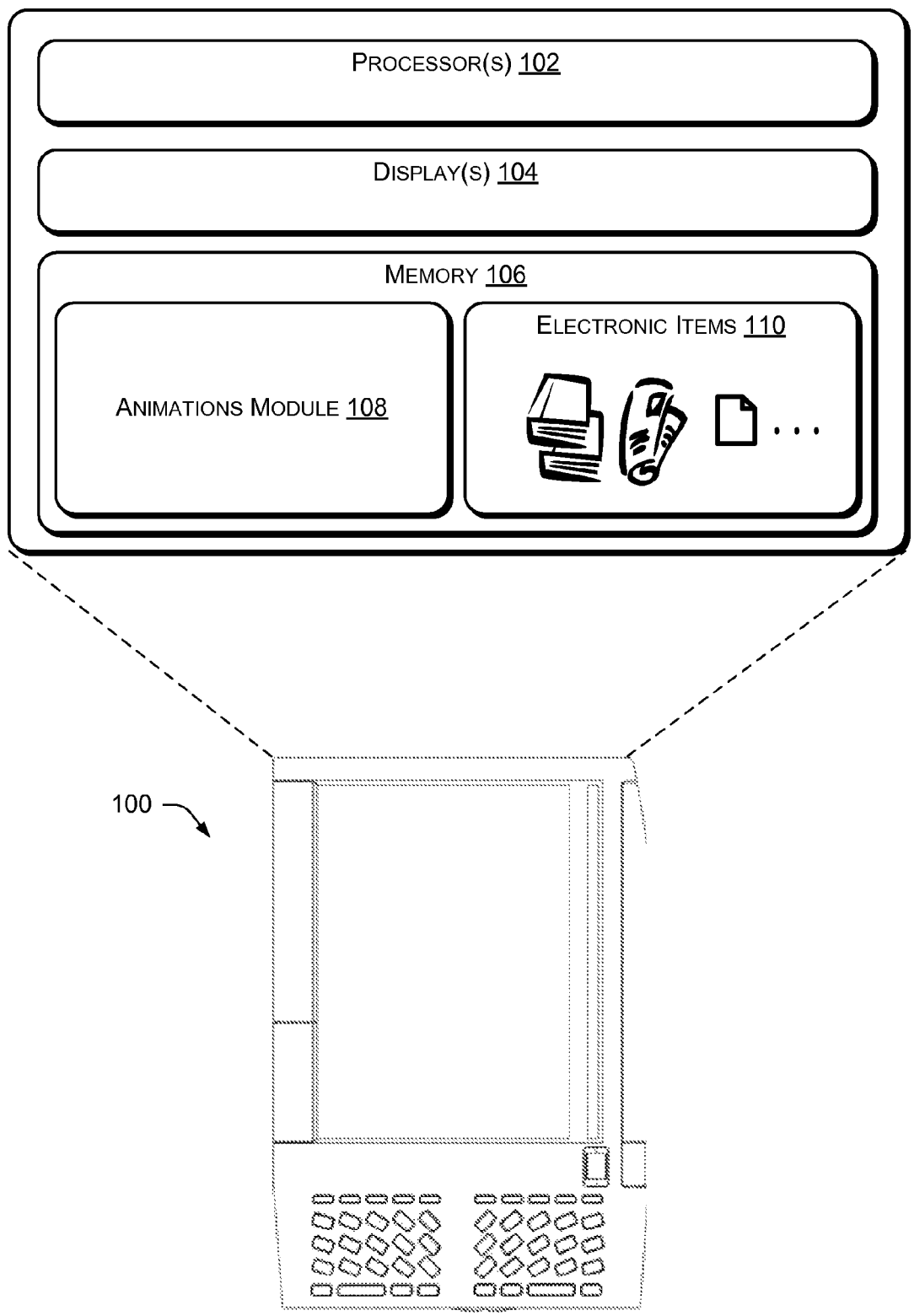
FIG. 1 illustrates one example of an electronic-booker reader that may implement animations described herein.

FIG. 1 illustrates one example of an electronic-book reader 100 employing techniques described herein. Electronic-book reader 100 is merely provided as an example; multiple other computing devices may similarly employ the described techniques. The devices may include, without limitation, a personal computer, a laptop computer, a Portable Digital Assistant (PDA), a mobile phone, a set-top box, a game console, and so forth.

As illustrated, electronic-book reader 100, or reader 100, includes one or more processors 102, as well as a display 104 and memory 106. Memory 106 may include volatile and nonvolatile memory, removable and non-removable media implemented in any method or technology for storage of information, such as computer-readable instructions, data structures, program modules, or other data. Such memory includes, but is not limited to, computer-readable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. Computer readable program code, meanwhile, may be any type of code stored on any type of computer-readable medium.

Memory 106 is shown to include an animations module 108, as well as one or more electronic items 110. Electronic items 110 may comprise any sort of electronic content capable of being rendered on display 104. These items may include, for example, an electronic book, Web pages, electronic news articles, applications, device tools, and the like.

Animations module 108, meanwhile, may create and present one or more forms of animation upon display 104. These animations may occur in response to receiving a request to perform an operation upon electronic content presented on display 104. These animations may also occur alternatively or additionally in response to receiving an instruction to move a position of a displayed cursor. For instance, an animation may occur between a time when a user enters a command on reader 100 and a time when the command is processed and presented to the user. As such, these animations may serve to notify the user that a command has been received and is being processed. These animations may also occur in response to other user- or device-initiated operations, such as a pop-up box appearing on display 104. Descriptions of actions an animation module 108 may implement are detailed herein below.

Figure 2A:
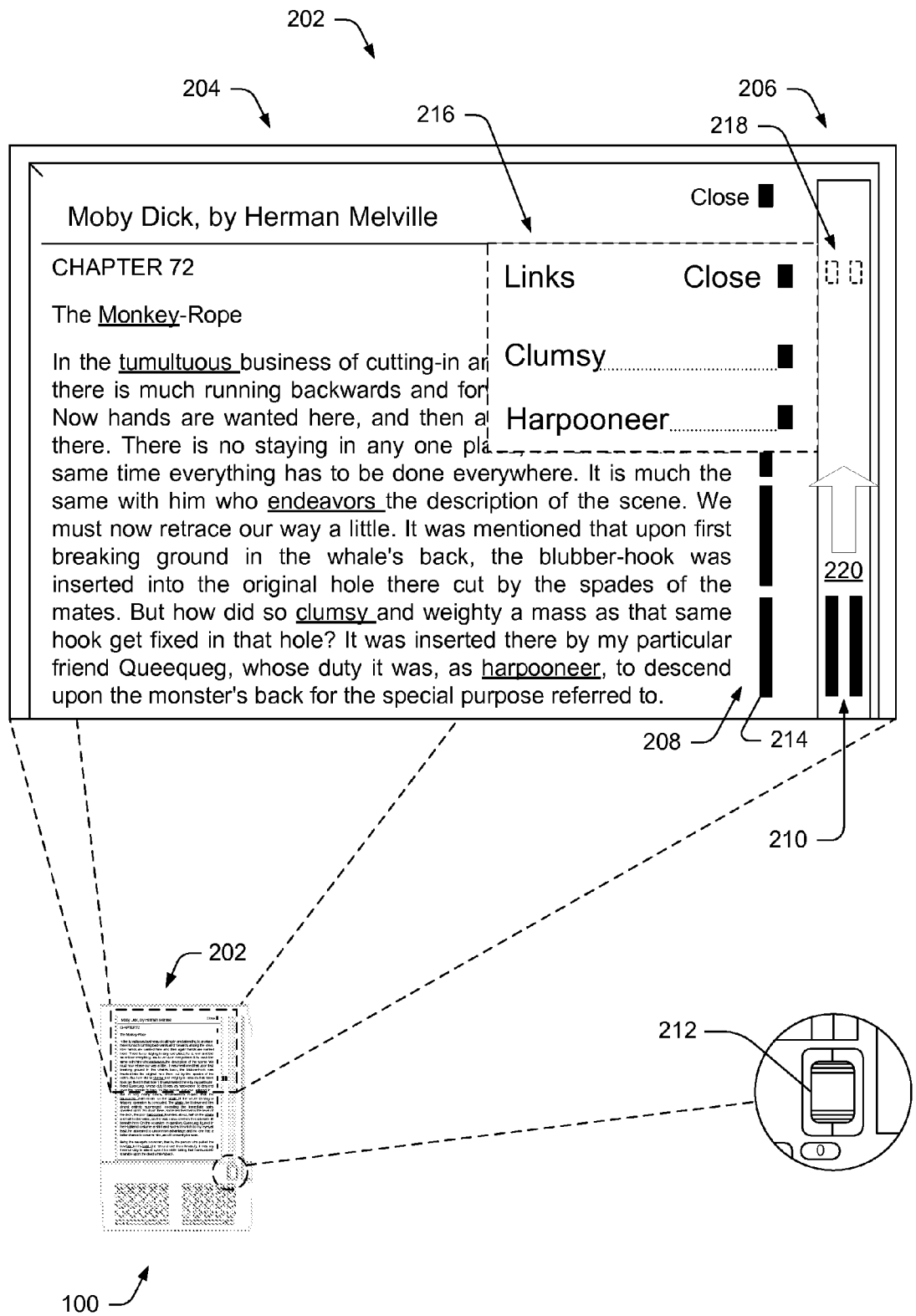
FIGS. 2A-2E illustrate an electronic-book reader, as illustrated in FIG. 1, the reader having a first screen area for displaying content and a second screen area for displaying a cursor to select portions of the content. Here, the cursor selects a portion of the content, which results in a form of animation. In addition, the displayed content is altered in response to the selection.

FIG. 2A displays an electronic-book reader 100 that includes a screen 202 to display electronic media items, such as electronic books and web content, as well as any other items that can be displayed electronically on screen 202. In the instant illustration, screen 202 is shown to display an electronic book, namely MOBY DICK by Herman Melville.

Screen 202 includes a first screen area 204 and a second screen area 206. First screen area 204 displays content, such as an electronic book, associated menus, and the like. First screen area 204 also displays one or more selectable markers 208, each of which corresponds to a portion of the displayed content. Although first screen area 204 is shown to include selectable markers 208, other implementations may not include these markers. Still other implementations may include these markers when displaying some but not other types of content on first screen area 204. For instance if first screen area 204 displays a web browser and corresponding web content, then first screen area 204 may not include markers 208. If, however, first screen area 204 displays a home page or the like of device 100, then markers 208 may be included.

Second screen area 206, meanwhile, enables selection of selectable markers 208 and, hence, selection of one or more portions of the displayed content. In implementations where first screen area 204 does not include selectable markers 208, screen 206 enables selection of the portions of displayed content directly. To select markers 208 and/or a portion of the displayed content, second screen area 206 includes a cursor 210, here illustrated as two parallel bars. While FIG. 2A illustrates a cursor to select the selectable markers, other environments and/or contexts may utilize other selection means. For instance, a keypad of electronic-book reader 100 may be used in instances where each of selectable markers 208 corresponds to a letter, a numeral, or the like.

To select a selectable marker, a user first aligns cursor 210 with one of markers 208 with use of a cursor actuator 212. While cursor actuator 212 is illustrated as a thumbwheel, other actuators such as a touch pad, a rollerball, or the like may also be utilized. Once aligned, the user may select the marker by actuating cursor actuator 212. After selection of the marker, the displayed content within first screen area 204 may be altered in accordance with the selection.

In the illustrated example, the text associated with the displayed electronic book is shown to include multiple links. These links may be web links, internal links, or the like. For purposes of the instant discussion, selection of one of selectable markers 208 will result in the displayed content being altered to display a menu of the links within a corresponding section of text. It is specifically noted, however, that these selections merely highlight the described animations, and that such animations may likewise occur in response to multiple other selections or operations. For instance, the animations described below may also occur in response to a pop-up window appearing in first screen area 204.

In the instant example, FIG. 2A illustrates that cursor 210 currently aligns with a selectable marker 214. Selectable marker 214 corresponds to a portion of the displayed content including links for "clumsy" and "harpooneer". Therefore, when the user selects marker 214 by actuating cursor actuator 212, a menu 216 containing these links may appear within first screen area 204. FIG. 2A illustrates this to-be-rendered menu in dashed lines. The selecting of marker 214 may also be effective to locate cursor 210 in a different position 218. Again, FIG. 2A illustrates this future position in dashed lines.

In some instances, first screen area 204 and second screen area 206 may have different refresh rates—or different rates at which displayed content may be altered. In some specific instances, second screen area 206 has a refresh rate that is faster than a refresh rate of screen area 204. As such, displayed content (e.g., cursor 210) within second screen area 206 may be altered sooner than first screen area 204 after selection of marker 214.

Due to the faster refresh rate, screen area 206 may be utilized to indicate to the user that a selection is being processed. In some instances, cursor 210 may undergo some form of animation after selection of marker 214 and before the content displayed within first screen area 204 is altered. Again, this animation may indicate to the user that selection of marker 214 is being processed. While cursor 210 is shown to undergo the animations, other entities may alternatively or additionally undergo this animation. These other entities may reside within second screen area 206.

FIG. 2A thus represents cursor 210 and cursor actuator 212 selecting marker 214. In response, cursor 210 begins growing or expanding, as arrow 220 represents. In some instances, cursor 210 may expand towards future position 218 of the cursor. Future position 218 represents a position of the cursor after the selection has been processed and after the displayed content has been altered. Therefore, FIG. 2A illustrates cursor 210 growing in an upward direction. Note while FIG. 2A represents selection of marker 214, other implementations may not include marker 214. Here, a user may merely align cursor 210 with the desired displayed content and actuate cursor actuator 212.

Figure 2B:
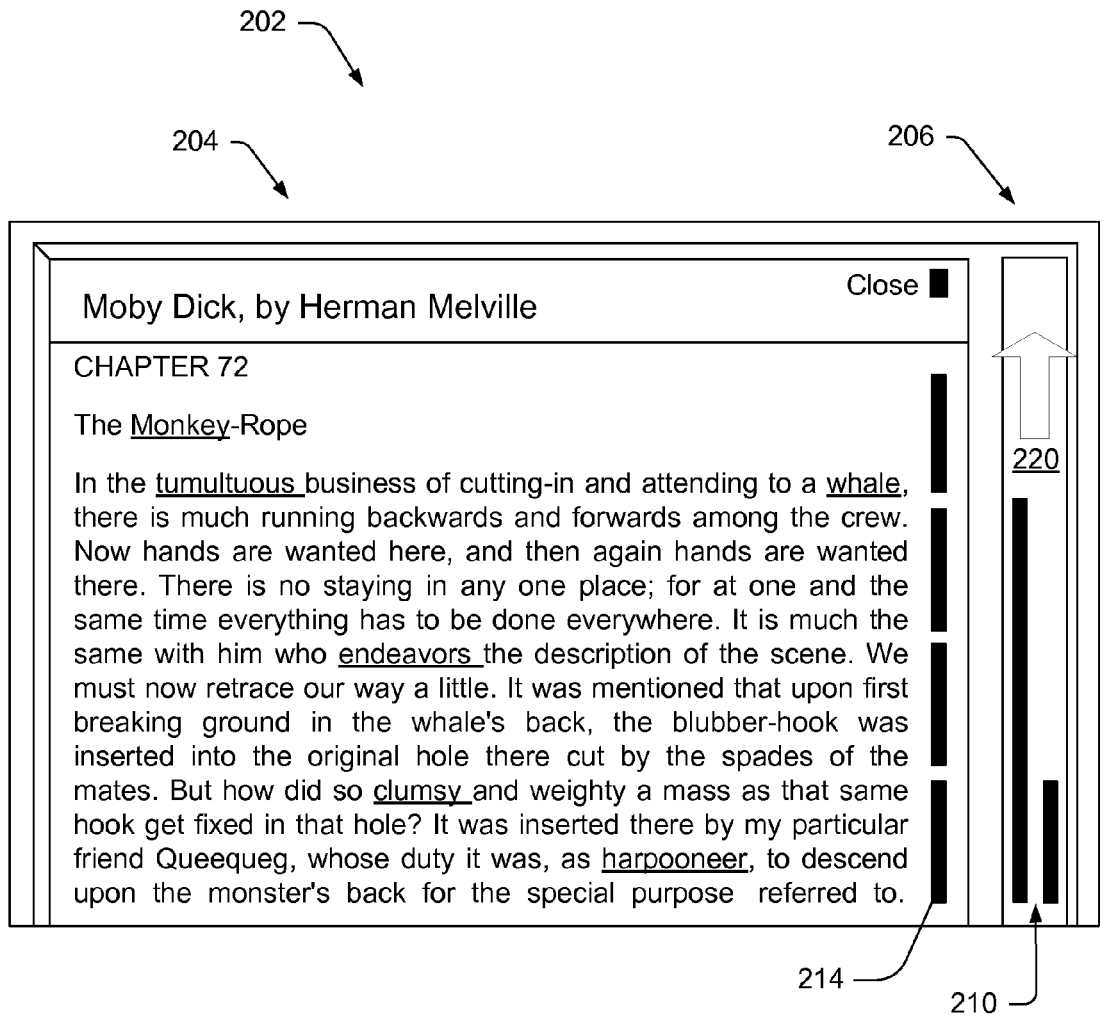
Figure 2C:
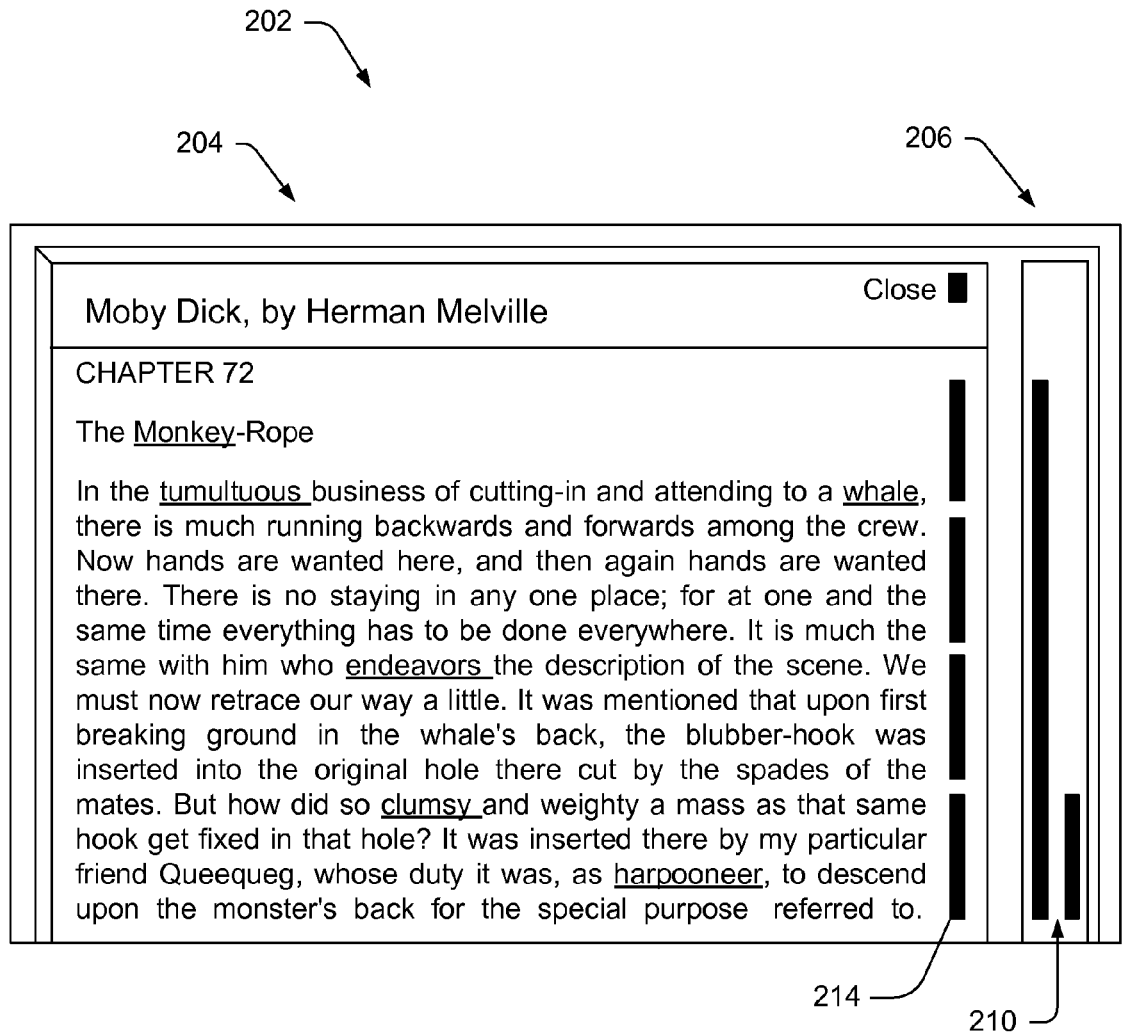
Figure 2D:
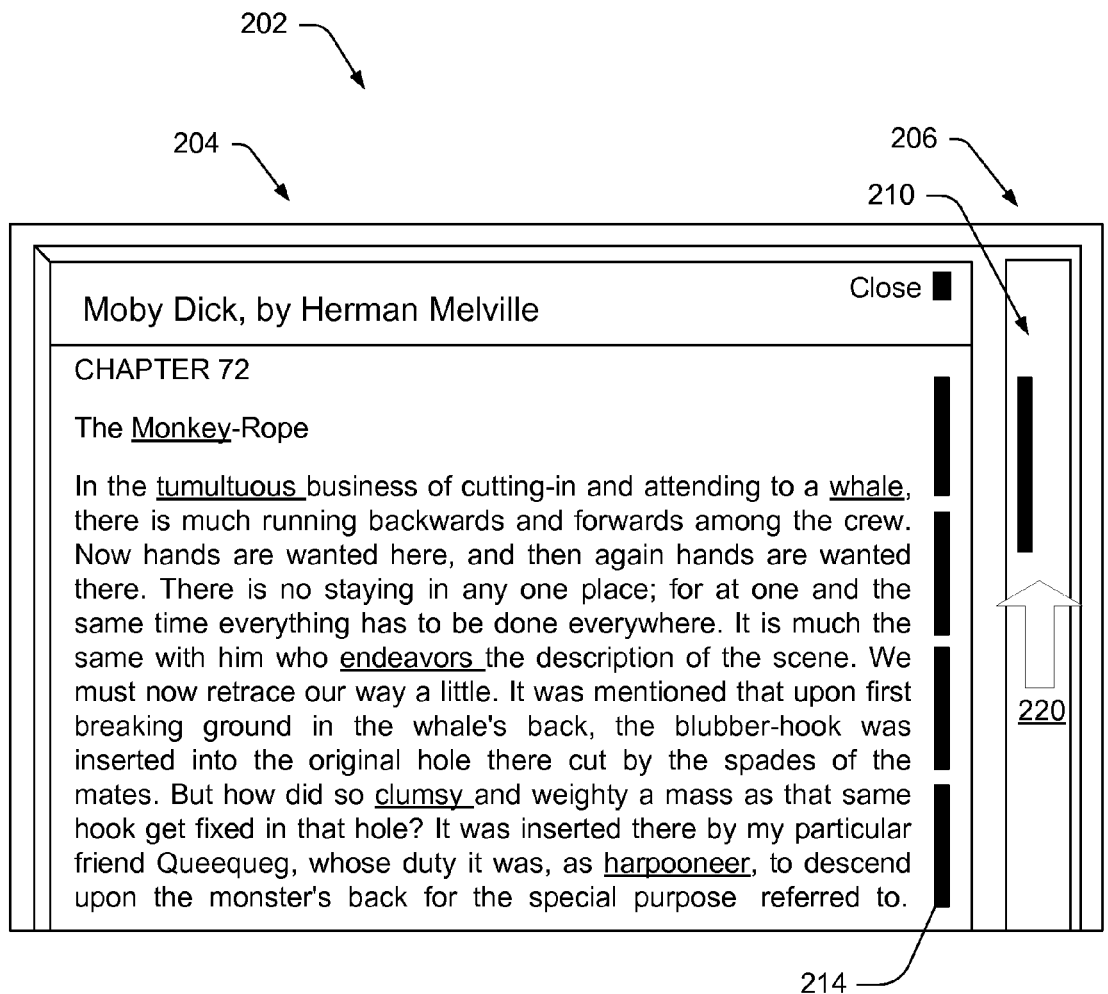

FIG. 2B continues the illustration of FIG. 2A. Again, FIG. 2B shows cursor 210 expanding in the upward direction. Although only a single bar of cursor 210 is shown to expand, the entire cursor may expand in other implementations. FIG. 2C, meanwhile, illustrates that a top of cursor 210 has reached the future position of the cursor. Growth of the cursor thus ceases, as the absence of arrow 220 represents. FIG. 2D represents that, at this point, cursor 210 may begin to shrink or reduce in size. That is, a bottom of cursor 210 may begin moving toward the future position of the cursor. In the illustrated instance, arrow 220 represents that the bottom of cursor 210 may begin moving upwards towards the future position.

Figure 2E:
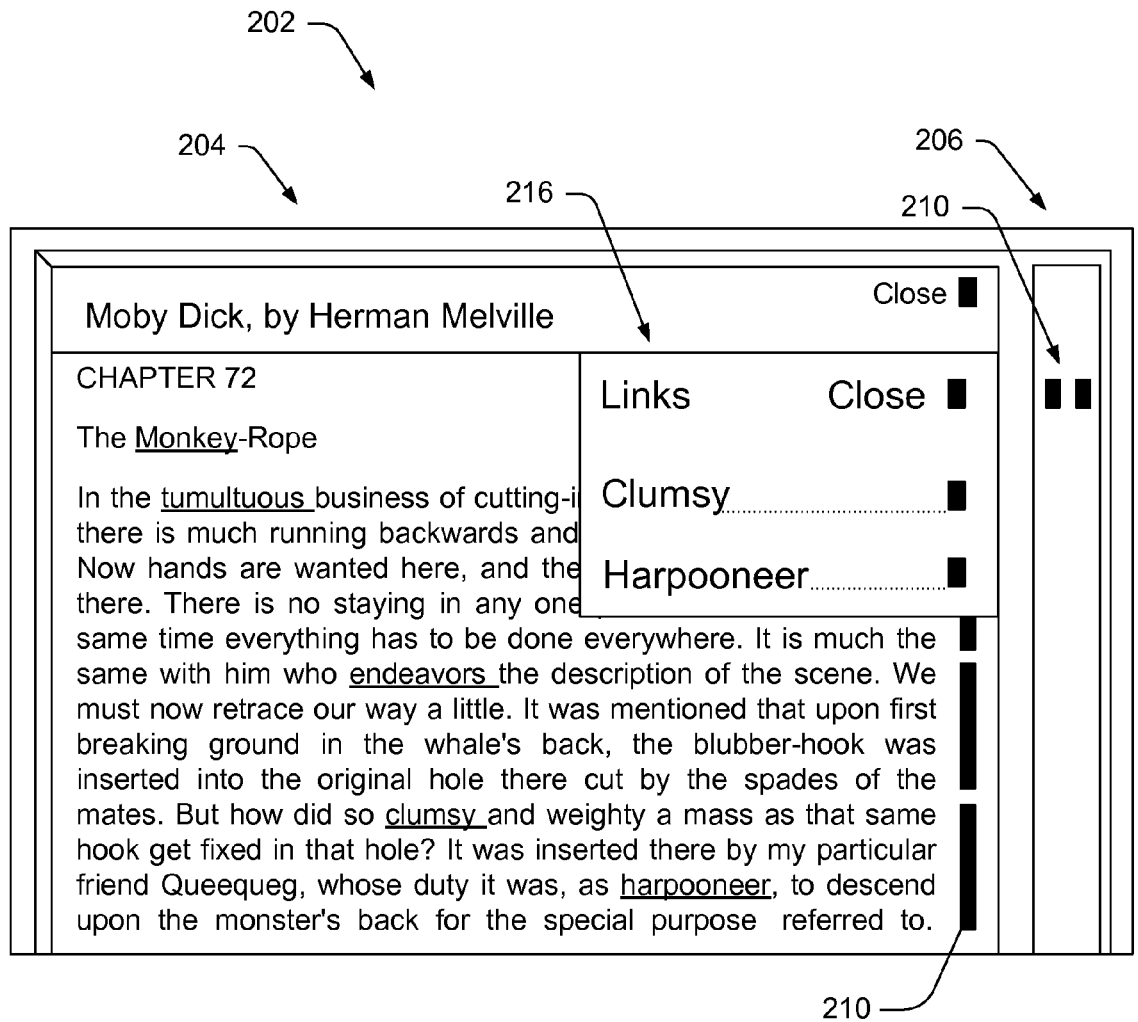

Finally, FIG. 2E represents that the bottom of cursor 210 reaches the new position, at which point the cursor's animation may cease, as the absence of arrow 220 represents. At this point, the displayed content within first screen area 204 has been altered to display menu 216. In addition, note that the second bar of cursor 112 may reappear at this time.

Note also that a time taken to conduct the animation of FIGS. 2A-2E may be independent of a distance between a cursor's initial position and the cursor's future position in some instances. That is, the animation may take the same amount of time regardless of the distance between the initial and future cursor positions. Additionally, some implementations conduct these animations in a non-linear manner. For instance, cursor 210 may begin growing a certain speed before slowing down as cursor 210 approaches future position 218. This may also be true for reduction or shrinking of cursor 210

In sum, animation of cursor 212 may occur in response to receiving an instruction to move the cursor. This animation may also occur in response to a user- or device-initiated request to perform an operation upon the presented electronic content. This animation may fill or approximately fill a gap between a time an operation occurs and a time at which results of the operation are rendered by first screen area 204. For instance, these animations may fill the gap between a time at which marker 214 is selected and a time at which menu 216 is presented to the user. Additionally, the animation may indicate to the user future position 218, the future position corresponding to a cursor position at a time when the selection has been processed and the displayed content altered. While FIGS. 2A-2E illustrate a single illustrative form of animation, other animations may similarly be employed.

Figure 3:
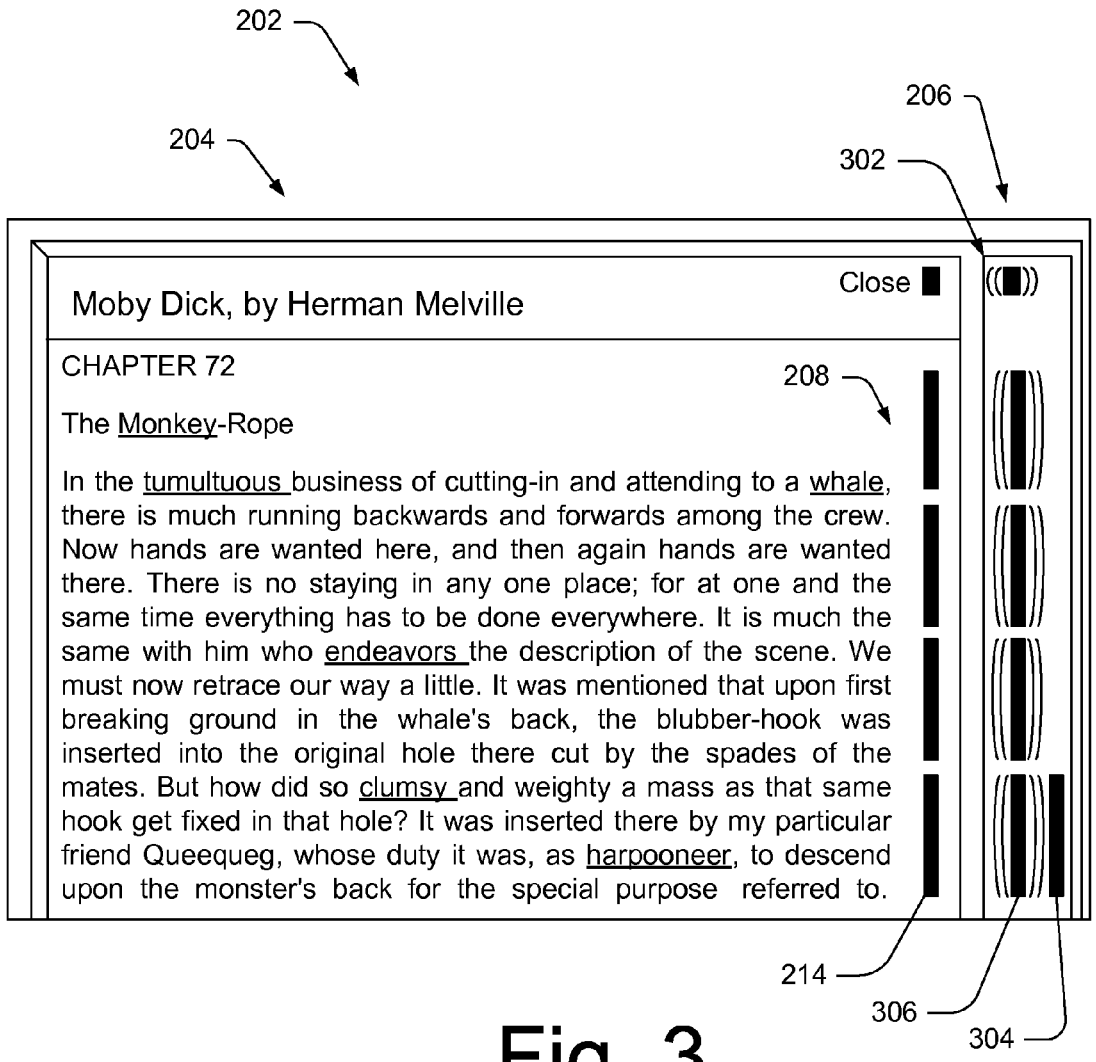
FIG. 3 illustrates another example of a form of animation.

FIG. 3, for instance, illustrates another illustrative form of animation. Here, second screen area 206 reproduces selectable markers 208, as illustrated by markers 302. FIG. 3 also illustrates a cursor 304, which is a single bar in this instance. Here, cursor 304 may align with and actuate one of selectable markers 208 and 302 with use of cursor actuator 212.

In the instant illustration, cursor 304 selects a selectable marker 306 that again corresponds to marker 214. In response to the selection, one or more of markers 302 may undergo some form of animation, as may cursor 304. In some implementations, some or all of the non-selected markers may shrink or reduce in size. In fact, these non-selected markers may initially grow in size before reducing in size before possibly disappearing from second screen area 206 altogether. In other implementations, the selected marker within second screen area 206 may grow in size until the displayed content within first screen area 204 is altered in accordance with the selection of markers 306 and 214. In still other implementations, both selected and non-selected markers may undergo some form of animation similar or different to the animations described above.

Figure 4A:
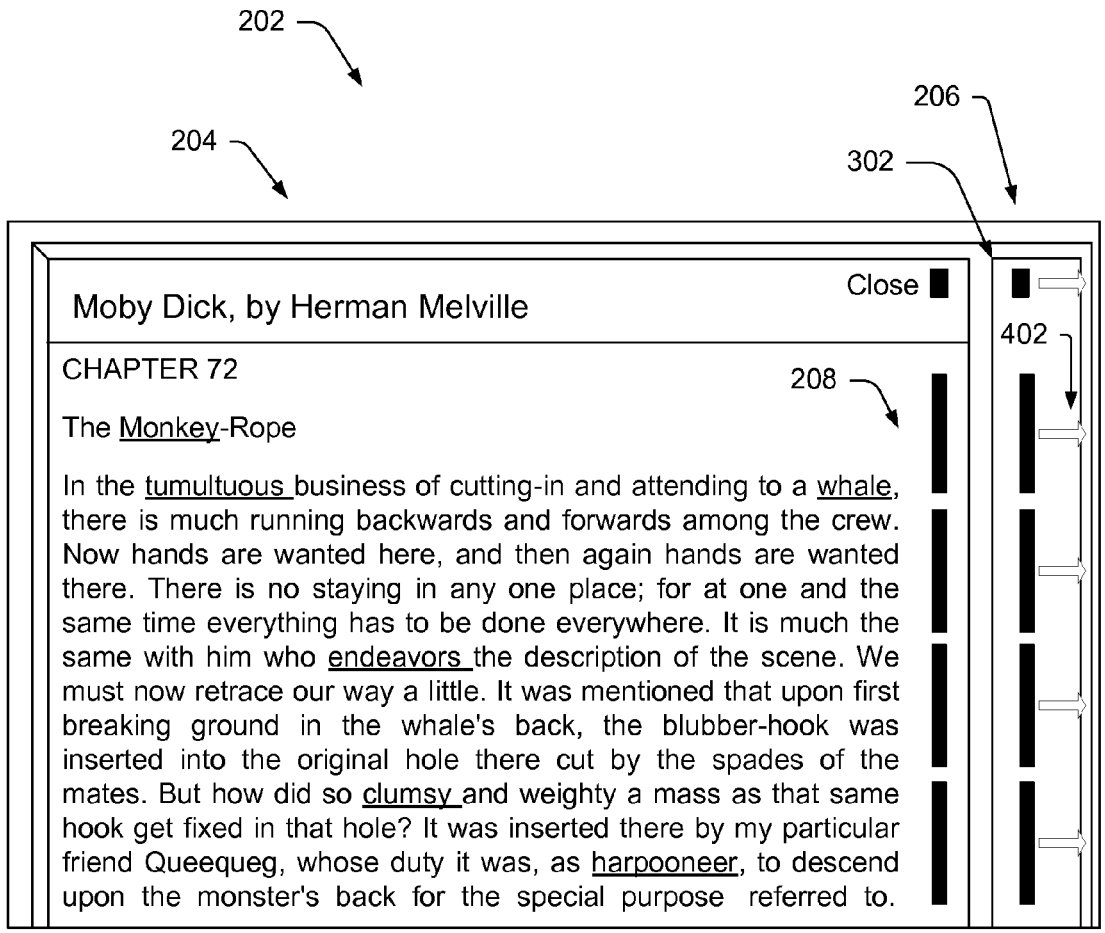
FIGS. 4A-4B illustrate a form of animation, wherein a first set of selectable markers exit the second screen area while a second set of selectable markers appear.
Figure 4B:
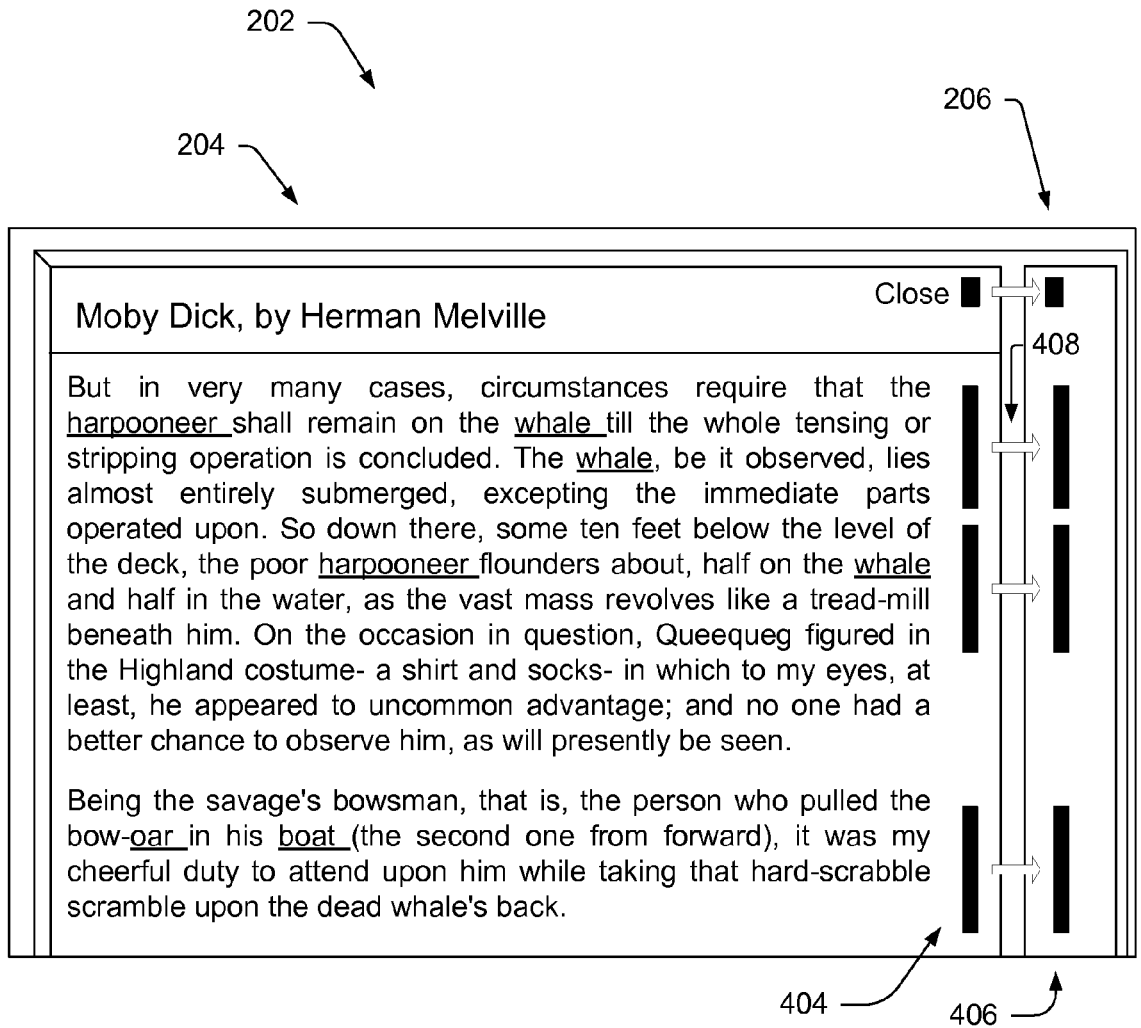

FIGS. 4A-4B illustrate an illustrative form of the animation discussed above in regards to FIG. 3. FIG. 4A illustrates a time immediately after a request to perform an operation upon the displayed content. For instance, a user may have chosen to view a "next page" of the illustrated electronic book. In response to this request, selectable markers 302 are shown as exiting second screen area 206 in an animated fashion. Here, markers 302 are shown to move off of screen area 206 to the right, as arrow 402 illustrates.

FIG. 4B continues the illustration, and depicts that the displayed content includes a new set of selectable markers 404. In response to this new set of markers 404, second screen area 206 reproduces these markers in the form of selectable markers 406. Selectable markers 406 are shown to move onto second screen area 206 in an animated fashion. In the instant example, markers 406 are shown to slide onto the screen from the left, as arrow 408 illustrates.

Figure 5A:
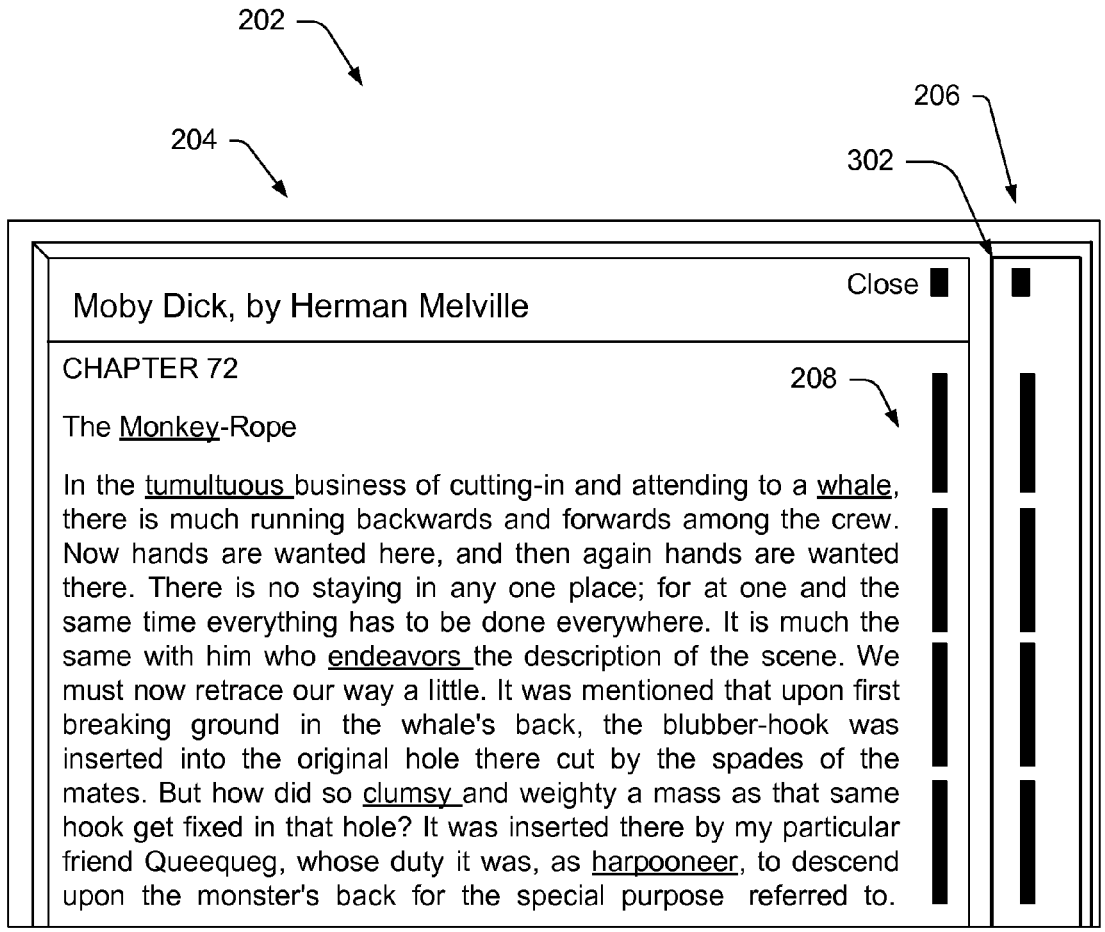
FIGS. 5A-5E illustrate a form of animation, wherein a first set of selectable markers shrinks and disappears from the second screen area, after which a second set of selectable markers appear.
Figure 5B:
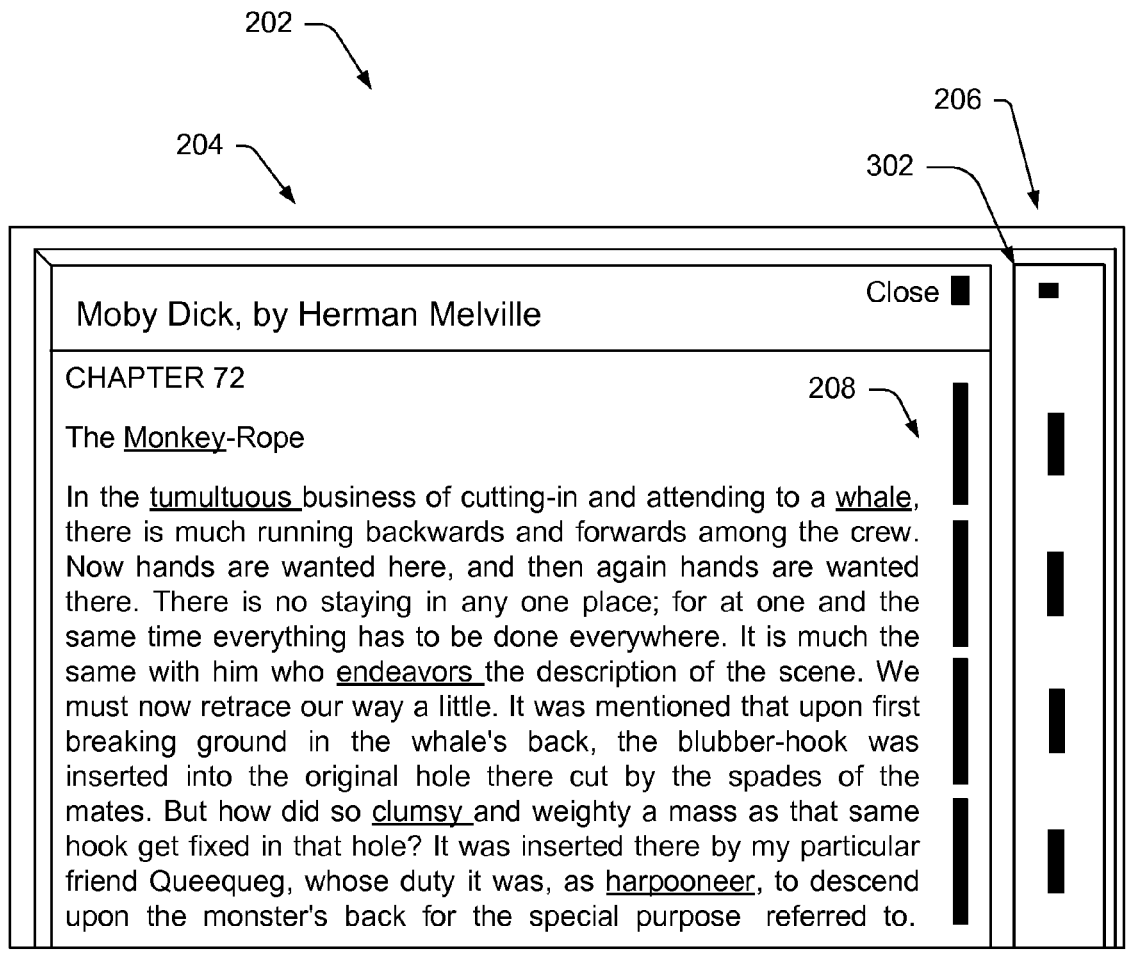
Figure 5C:
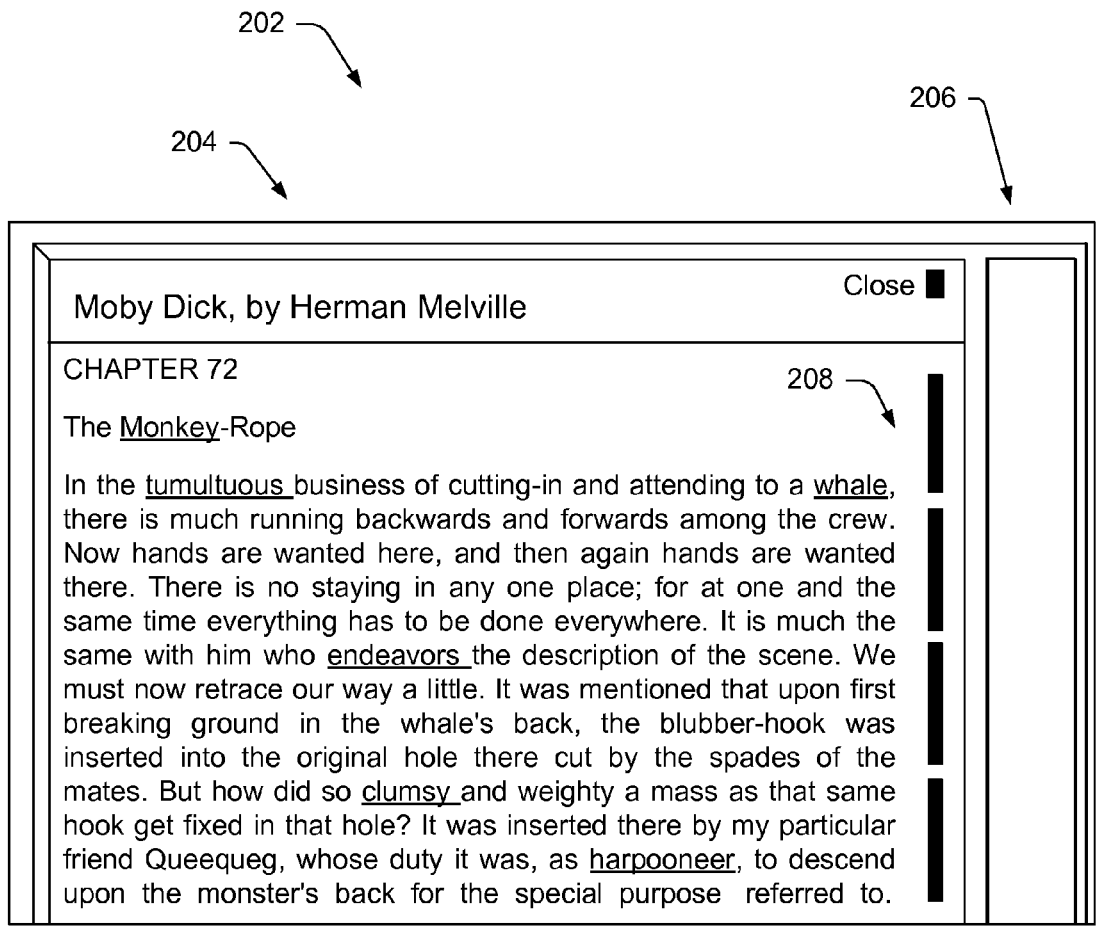

FIGS. 5A-5E illustrate yet another illustrative form of animation that may occur in response to a user- or device-initiated request to perform an operation upon the presented electronic content. Similar to the preceding example, these figures are described with reference to a user choosing to view a next page of the displayed electronic book. After the user makes such a selection at a time illustrated by FIG. 5A, FIG. 5B illustrates that selectable markers 302 begin to shrink in size. Note that a height and/or a width of these markers may shrink. FIG. 5C, meanwhile, shows that selectable markers 302 have disappeared entirely from second screen area 206.

Figure 5D:
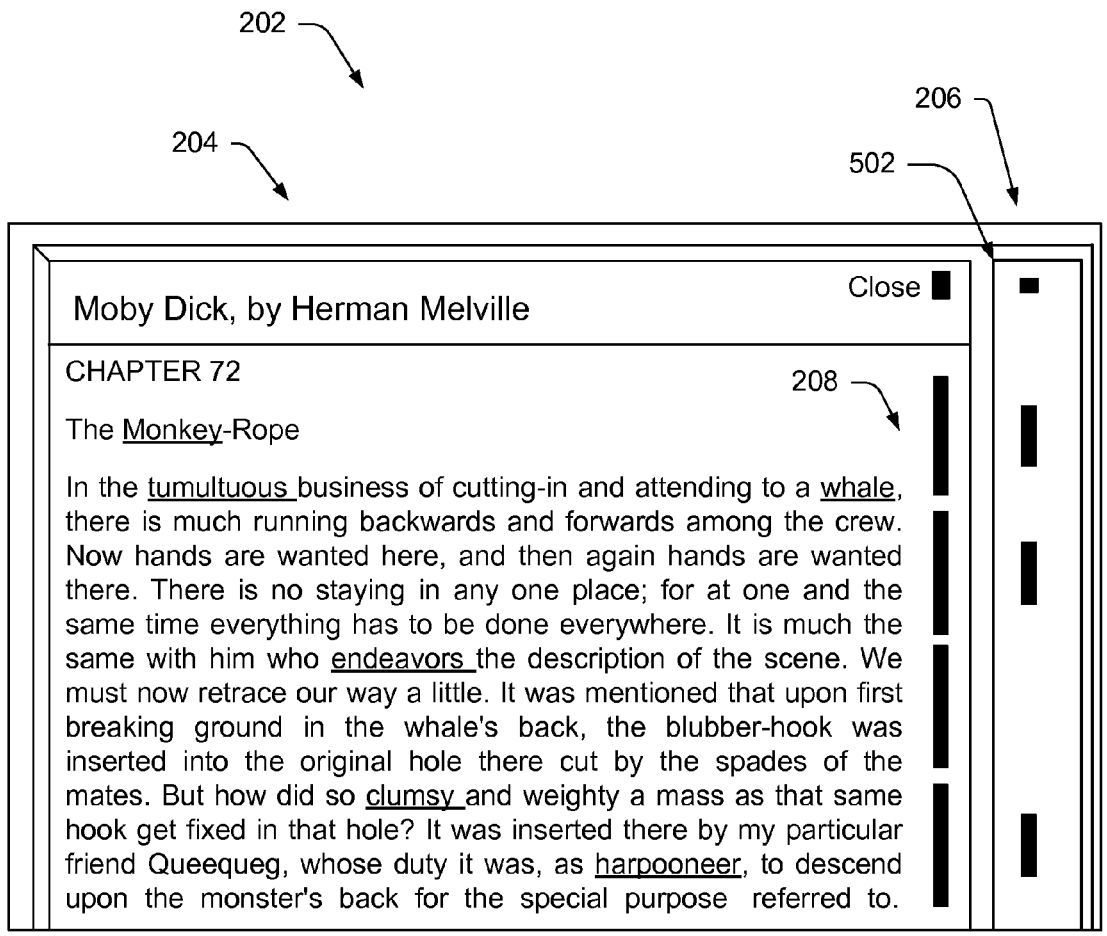
Figure 5E:
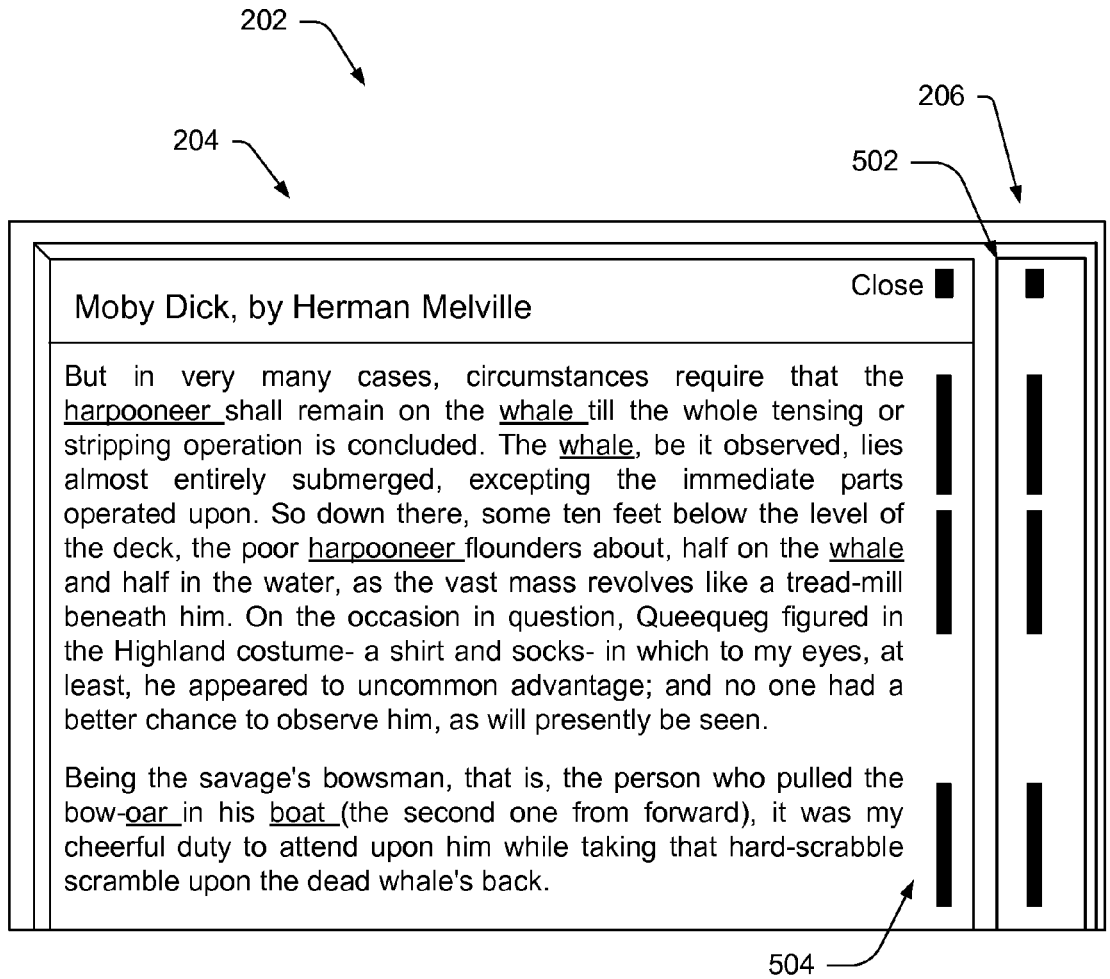

At a time illustrated by FIG. 5D, a new set of selectable markers 502 begin to grow within second screen area 206. This new set of markers may correspond to a set of selectable markers that will be displayed upon first screen area 204 once the next page of the book has been rendered. Finally, FIG. 5E shows that selectable markers 502 have grown to a full size, at which point animation of the markers may stop. In addition, FIG. 5E illustrates that the electronic book has processed the user's selection to view the next page and, accordingly, a set of selectable markers 504 has appeared within first screen area 204.

FIGS. 6A-6D illustrate yet another illustrative form of animation that may occur in response to a request to perform an operation upon the presented electronic content, such as a cursor's selection of a selectable marker. Here, the cursor takes the form of an illustrative animated wait symbol 602. In the illustrative example, animated wait symbol 602 comprises a two-by-two matrix of boxes or dots. In some instances, three of these boxes may be empty, while another may be solid. The solid box may then iterate with time through each of the four positions (e.g., clockwise or counterclockwise), as FIGS. 4A-4D illustrate. This iteration may complete until the selection is processed and the displayed content within first screen area 204 is altered, such as depiction of menu 216 in FIG. 2E. Again, the animation of FIGS. 6A-6D may indicate to the user of electronic-book reader 100 that the user's selection is being processed.

Figure 6A:
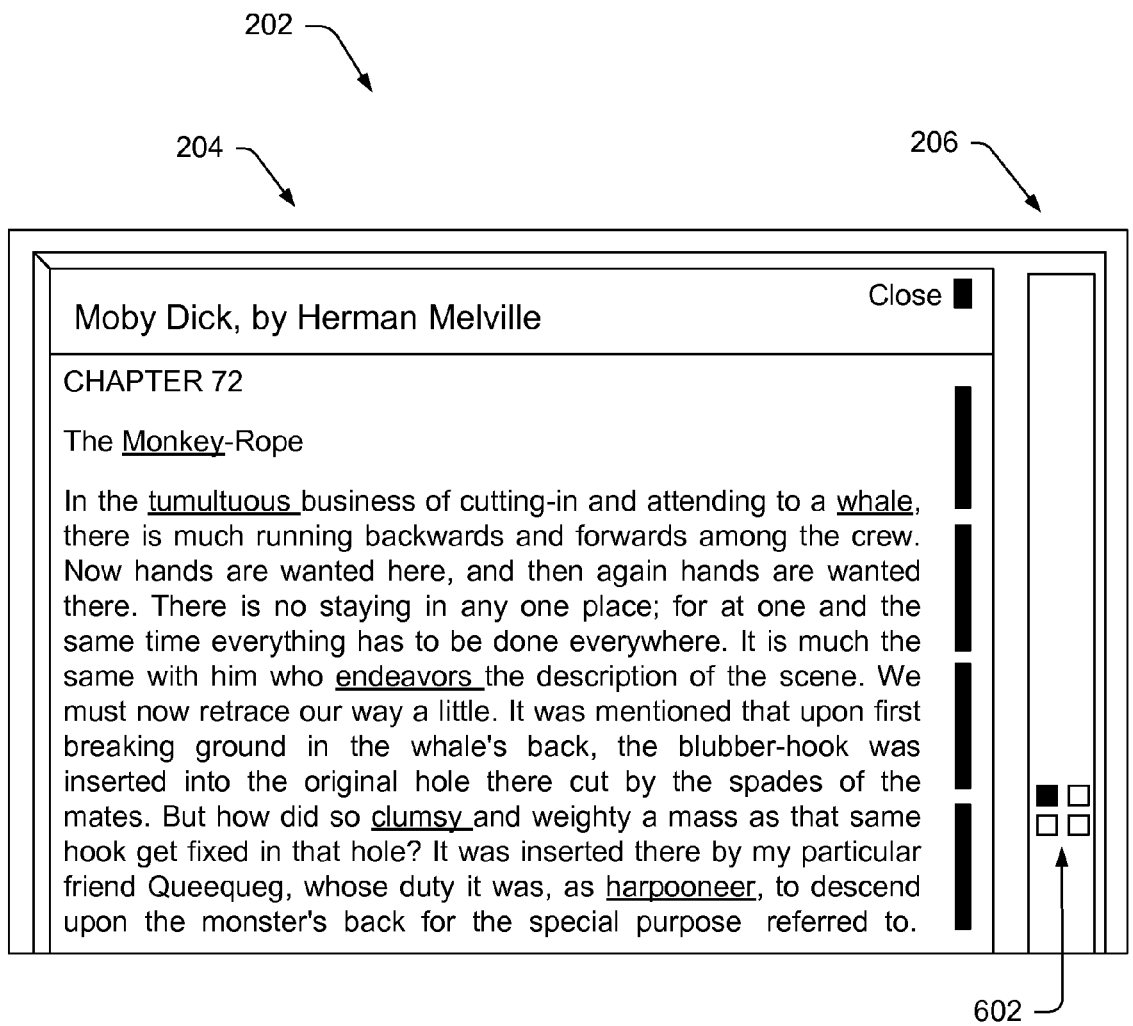
FIGS. 6A-6D illustrate a form of animation, wherein the animation comprises an animated wait symbol.
Figure 6B:
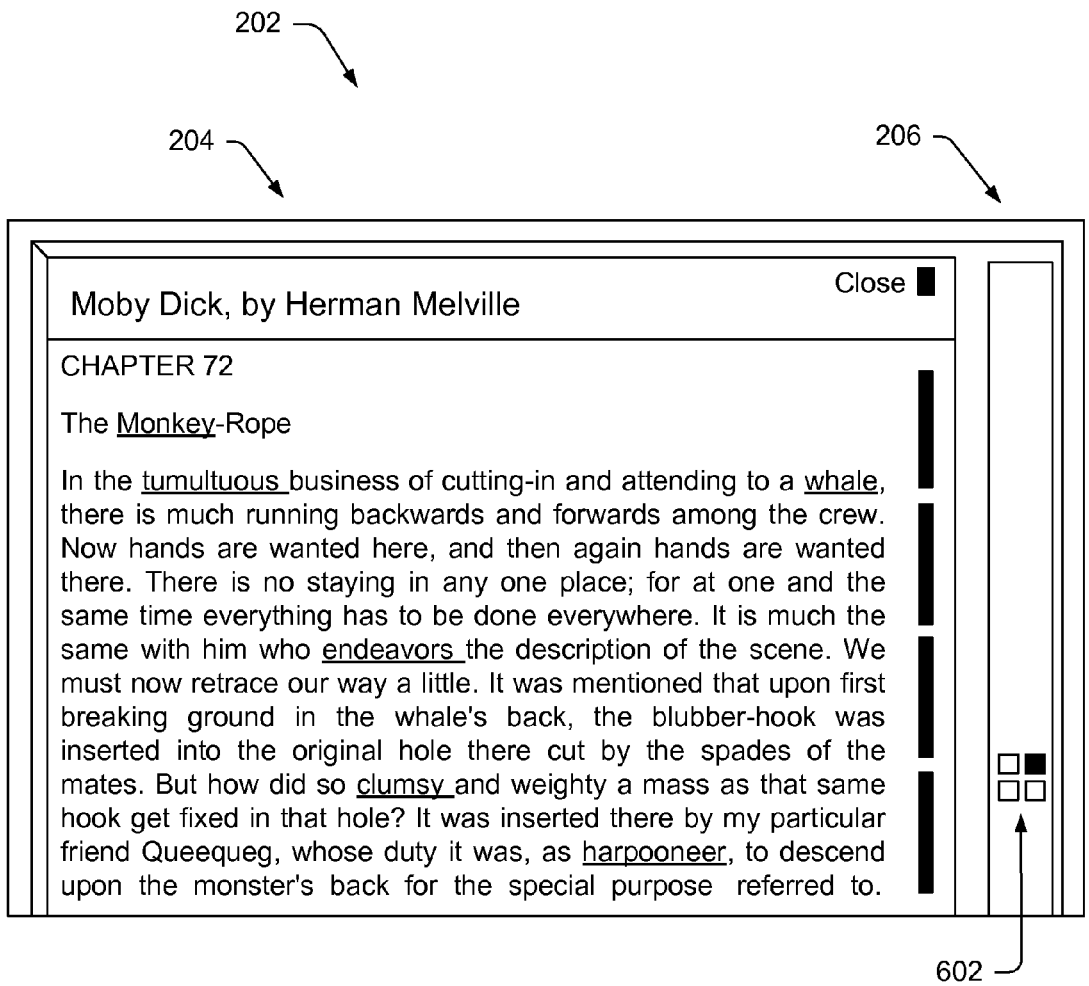
Figure 6C:
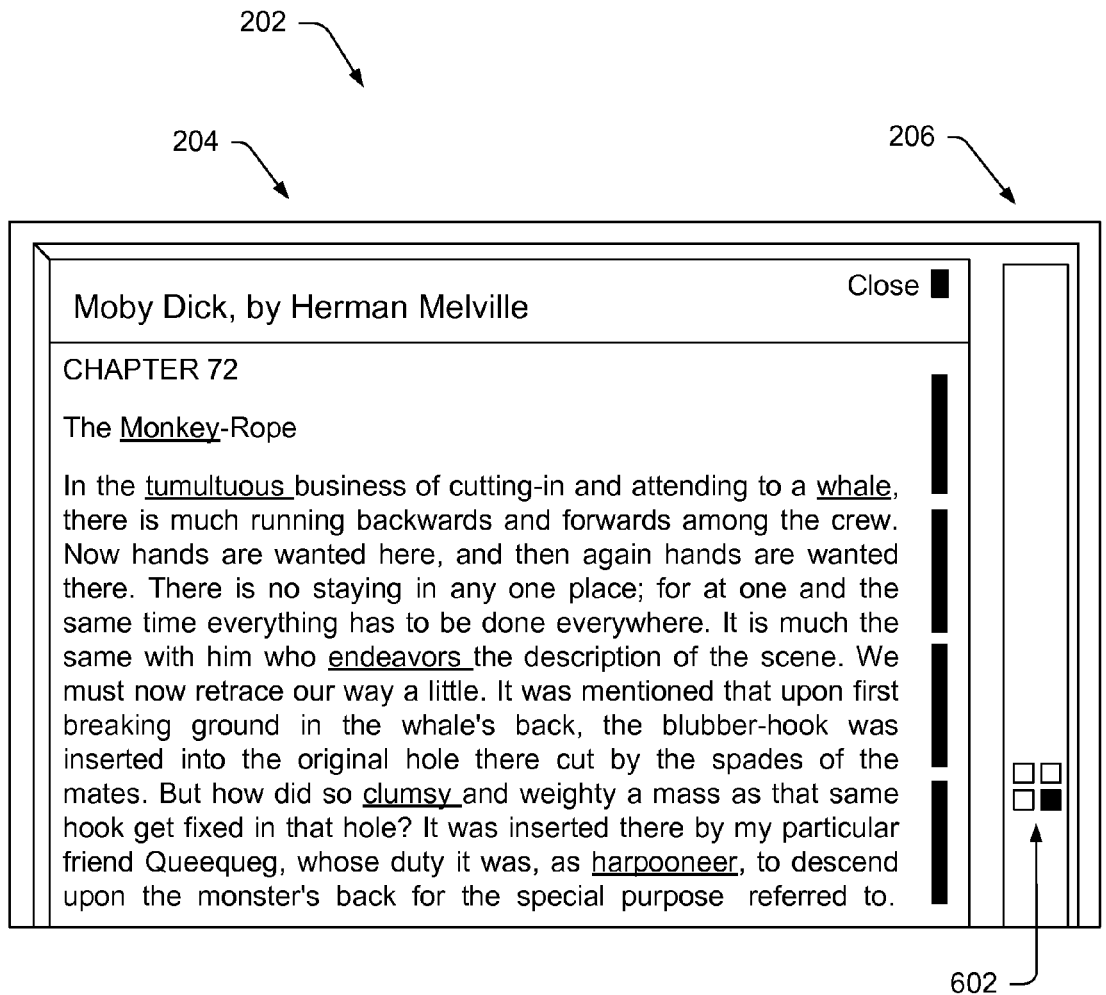
Figure 6D:
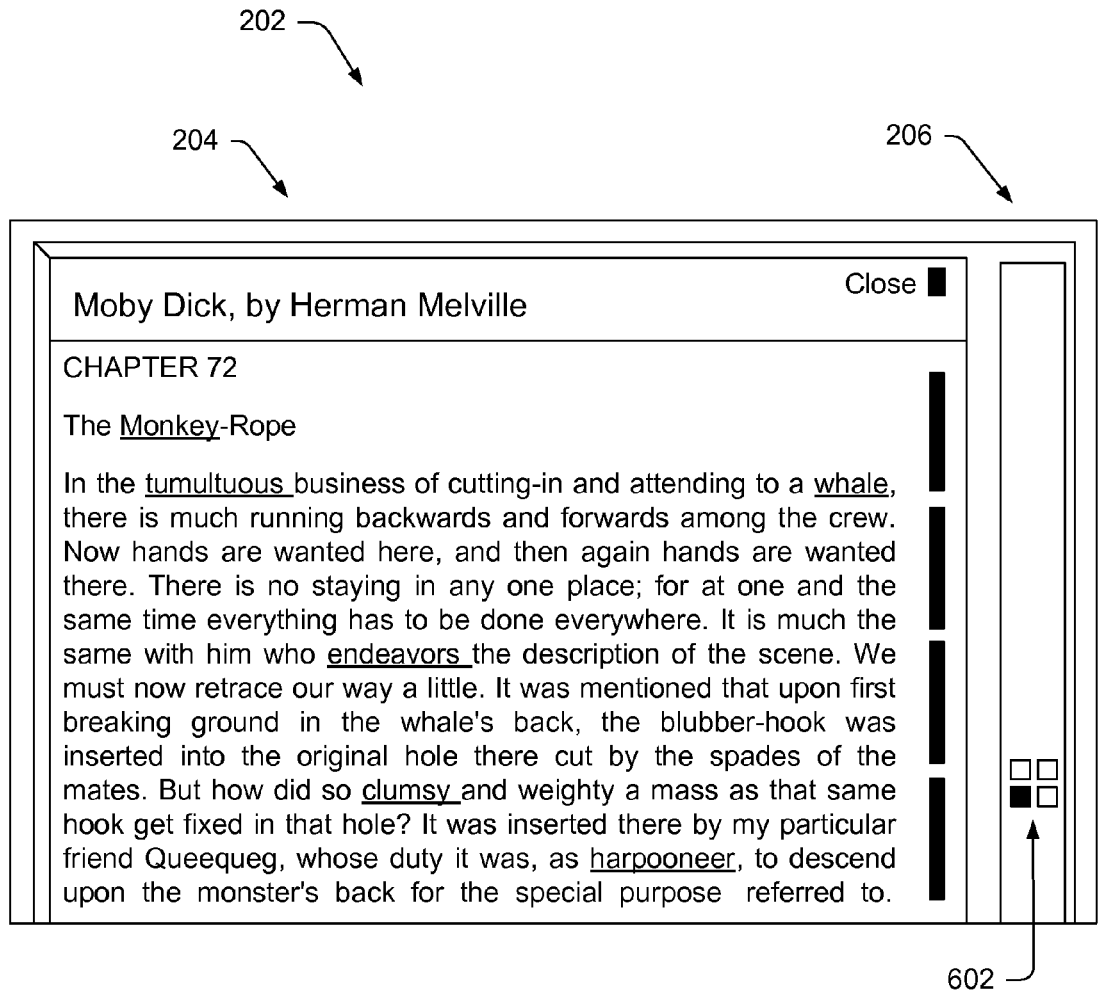

Although FIG. 6A depict one illustrative animated wait symbol, others may be similarly implemented. For instance, three of the four boxes may be solid, while an empty box iterates through each of the four positions (e.g., clockwise or counterclockwise). Conversely, two boxes could be solid and two empty. For instance, a top-left box and a bottom-right box may be solid, before becoming empty while a top-right box and a bottom-left box become solid. This alternation of solid boxes may continue iterating during processing of the requested operation.

Figure 7A:
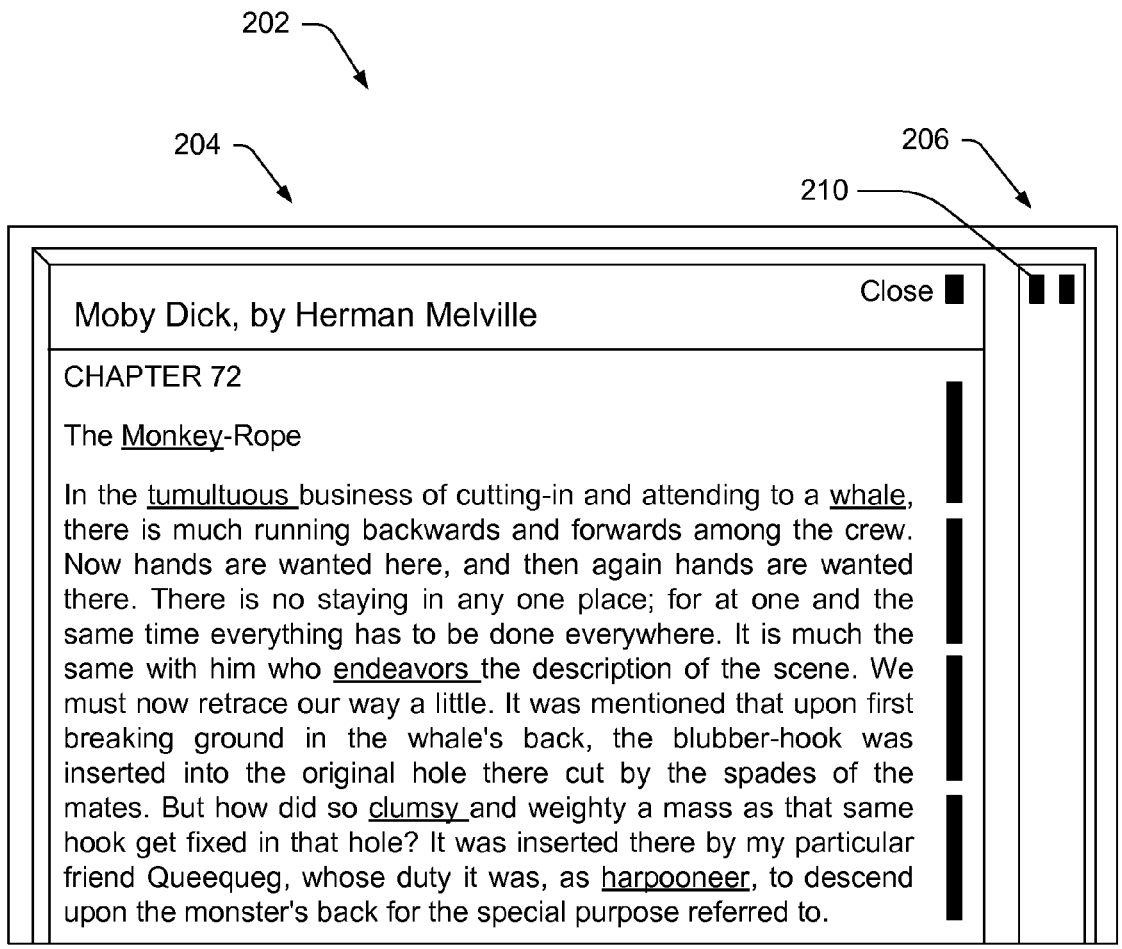
FIGS. 7A-7C illustrate a form of animation, wherein the animation occurs in response to a cursor selection to close out the previously-displayed electronic content.
Figure 7B:
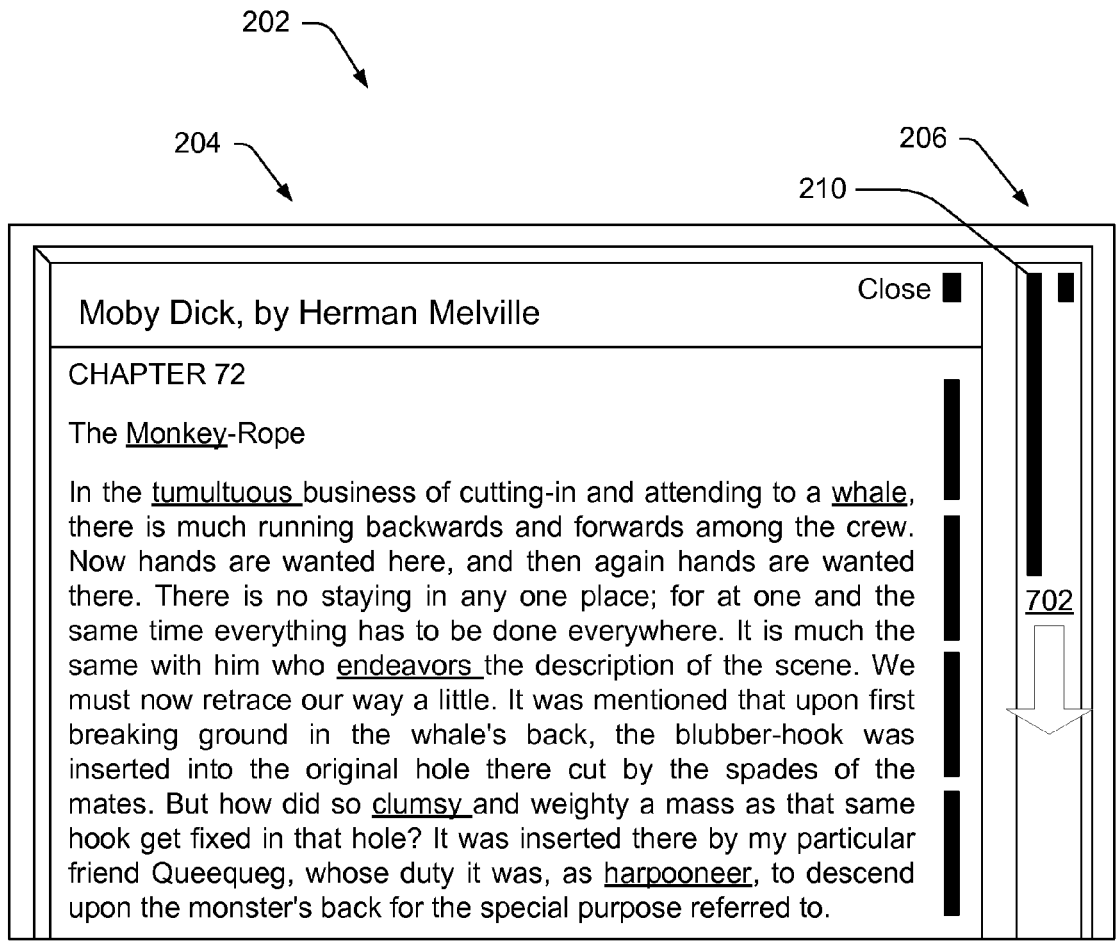
Figure 7C:
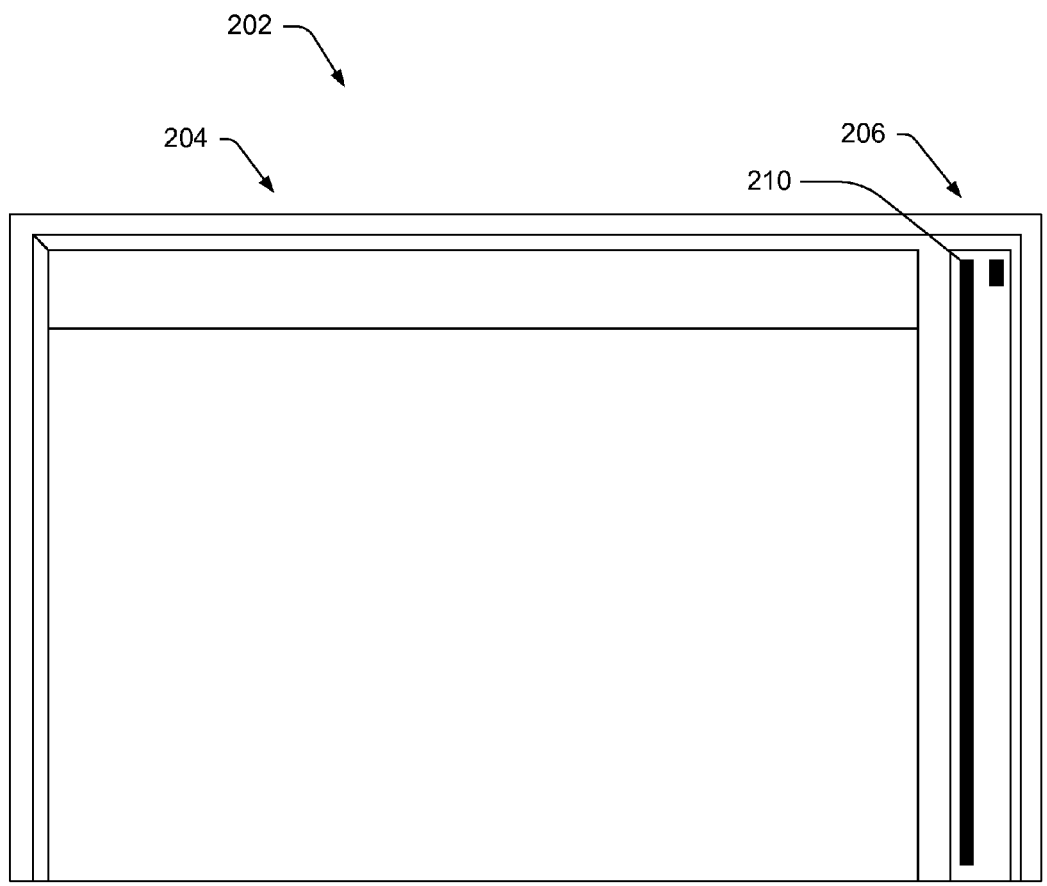

FIGS. 7A-7C illustrate yet another illustrative form of animation that may occur in response to receiving a request to perform an operation upon the presented content, such as a cursor's selection of a selectable marker. In some instances, this form of animation may occur in response to a user choosing to close the displayed content within first screen area 204, such as an open application or electronic book. FIG. 7A begins the illustration by showing a cursor selection to close the open electronic book. FIG. 7B then illustrates that cursor 210 may undergo some form of animation in response. Here, an arrow 702 represents that cursor 210 may grow or expand in a downwards direction while the electronic book processes the command to close the electronic book. FIG. 7C finally illustrates that cursor 212 may expand to the bottom of screen 202 before or while the previously-open electronic book closes. FIGS. 7A-7C thus illustrate how animation of cursor 210 may give the user an impression of a "curtain close" in response to the user's decision to close the electronic book.

While multiple illustrative forms of animation have been illustrated and discussed, other forms of animation may also be employed and are also envisioned. Some of these forms of animation may notify the user that an operation, such as a user selection, is being processed. This animation may also indicate to the user a position of the cursor once the operation has been processed and the displayed content has been altered accordingly.

Figure 8:
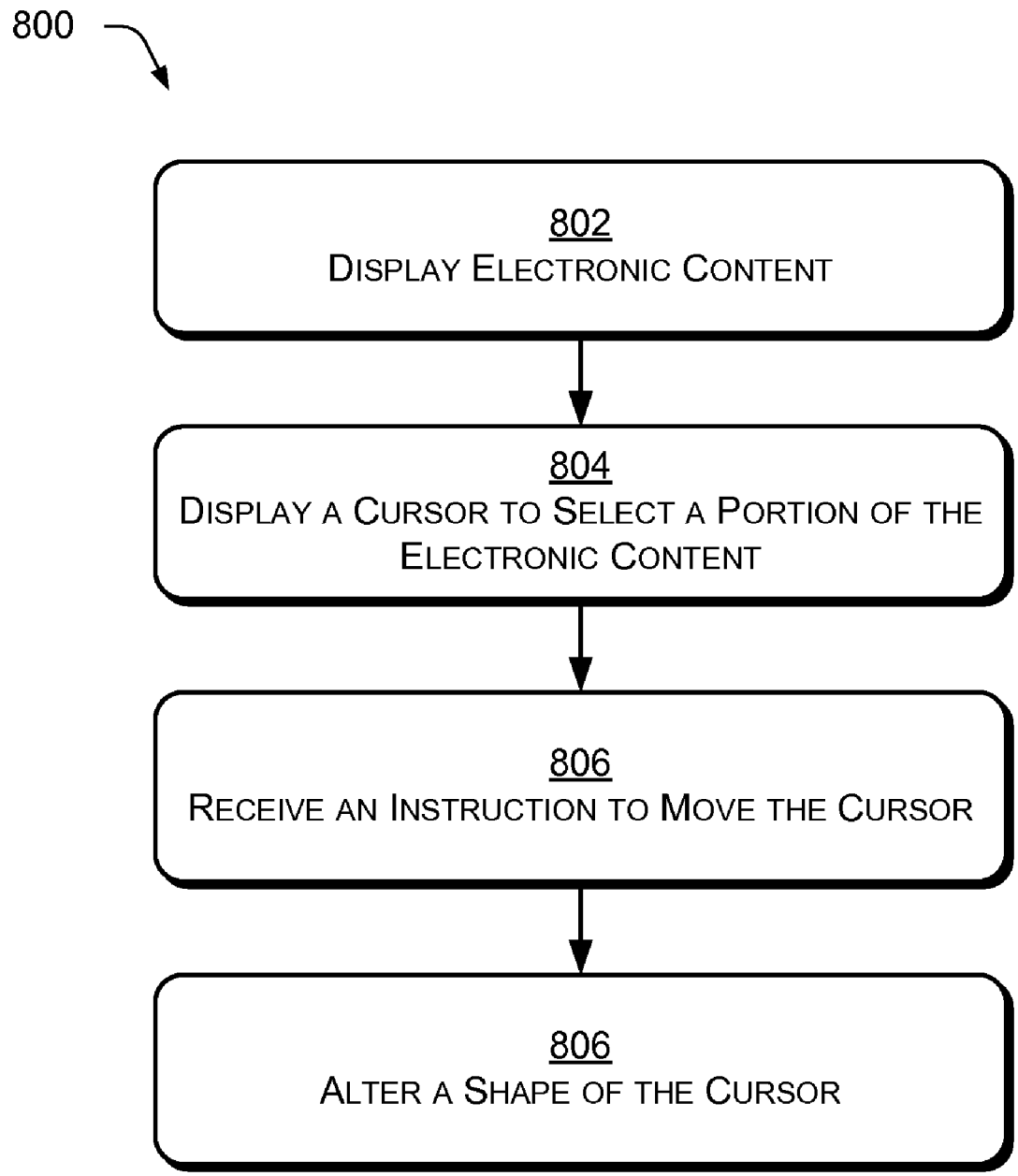
FIG. 8 is a flow diagram of a process for performing animations described herein.

FIG. 8 illustrates a process 800 for performing above-described animations. Process 800 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. These instructions may be embodied as computer readable program code stored on a computer-readable medium. This computer readable medium may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which may be used to store the desired information and which may be accessed by a computing device. In addition, the order in which the operations are described is not intended to be construed as a limitation, and any number of the described blocks can be combined in any order and/or in parallel to implement the process.

Process 800 includes operation 802, which displays electronic content. This content may comprise any sort of electronic content capable of being rendered on a display, such as each of electronic items 110. Operation 804, meanwhile, may display a cursor to select a portion of the electronic content, the cursor being located in a first position. Operation 806 represents receiving an instruction to move the cursor to a second position, which may or may not be different from the first position. For instance, a user could select a selectable marker or a pop-up window could be displayed. Operation 808 then alters a shape of the cursor to indicate the second position. As discussed above, in some implementations the cursor could grow and/or shrink to indicate this different position to the user.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
   displaying electronic content;
   displaying a cursor to select a portion of the electronic content, the cursor being located in a first position;
   receiving an instruction to move the cursor to a second position; and
   altering a shape of the cursor to indicate the second position in response to the receiving of the instruction;
   wherein the altering of the shape of the cursor comprises extending the cursor from the first position to the second position.

2. A method as recited in claim 1, wherein a user of a device that displays the electronic content triggers the instruction to move the cursor.

3. A method as recited in claim 1, wherein a device that displays the electronic content triggers the instruction to move the cursor.

4. A method as recited in claim 1, wherein selecting a portion of the electronic content with the cursor triggers the instruction to move the cursor.

5. A method as recited in claim 1, wherein displaying a pop-up box triggers the instruction to move the cursor.

6. An apparatus comprising:
   a display to present electronic content, the display comprising:
      a first screen area to present the electronic content, the first screen area having a first refresh rate when altering the presented electronic content;
      a second screen area to enable selection of one or more portions of the presented electronic content, the second screen area having a second refresh rate that is different from the first refresh rate, and wherein the second screen area enables animation in response to a request to perform an operation on the presented electronic content, wherein the operation comprises presenting a pop-up box in the first screen area; and
      an animations module to enable the animation.

7. An apparatus as recited in claim 6, wherein the second screen area includes a cursor to select the one or more portions of the presented electronic content, and wherein the animation comprises growth of the cursor.

8. An apparatus as recited in claim 6, wherein the second screen area includes a cursor to select the one or more portions of the presented electronic content, and wherein the animation comprises reduction of the cursor.

9. An apparatus as recited in claim 6, wherein the second screen area includes a selectable marker to enable selection of the one or more portions of the presented electronic content, and wherein the animation comprises movement of the selectable marker.

10. An apparatus as recited in claim 6, wherein the second screen area includes a selectable marker to enable selection of the one or more portions of the presented electronic content, and wherein the animation comprises moving the selectable marker off of the second screen area.

11. An apparatus as recited in claim 6, wherein the second screen area is configured to include a selectable marker to enable selection of the one or more portions of the presented electronic content, and wherein the animation comprises presenting a selectable marker on the second screen area.

12. An apparatus as recited in claim 6, wherein the second screen area includes a selectable marker to enable selection of the one or more portions of the presented electronic content, and wherein the animation comprises shrinking of the selectable marker.

13. An apparatus as recited in claim 6, wherein the second screen area is configured to include a selectable marker to enable selection of the one or more portions of the presented electronic content, and wherein the animation comprises growing a selectable marker on the second screen area.

14. An apparatus as recited in claim 6, wherein the second screen area includes one or more selectable markers to enable selection of corresponding one or more portions of the presented electronic content, and a cursor to select the one or more selectable markers, and wherein the animation comprises growth of a selected selectable marker.

15. An apparatus as recited in claim 6, wherein the second screen area includes one or more selectable markers to enable selection of corresponding one or more portions of the presented electronic content, and a cursor to select the one or more selectable markers, and wherein the animation comprises reduction of a non-selected selectable marker.

16. An apparatus as recited in claim 6, wherein the animation comprises an animated wait symbol.

17. An apparatus as recited in claim 6, wherein the second refresh rate is faster than the first refresh rate.

18. An apparatus comprising:
a display comprising:
a first screen area to display electronic content; and
a second screen area to display a cursor to select a portion of the electronic content, wherein a shape of the cursor changes responsive to receiving an instruction to alter a position of the cursor, wherein the change in the shape of the cursor indicates the altered position of the cursor, and wherein the change in the shape of the cursor comprises the cursor extending towards the altered position; and
an animations module to change the shape of the cursor responsive to receiving the instruction.

19. An apparatus as recited in claim 18, wherein the electronic content comprises a digital item.

20. An apparatus as recited in claim 18, wherein the electronic content comprises an electronic book.

21. An apparatus as recited in claim 18, wherein the change in the shape of the cursor comprises a growth of the cursor.

22. An apparatus as recited in claim 18, wherein the change in the shape of the cursor comprises expansion and contraction of the cursor.

23. An apparatus as recited in claim 18, wherein the change in the shape of the cursor further comprises the cursor contracting towards the altered position of the cursor.

24. A computer program product, comprising:
a computer usable medium having computer readable program code embodied in the medium for:
displaying electronic content;
displaying a cursor to select a portion of the electronic content, the cursor being located in a first position;
receiving an instruction to move the cursor to a second position; and
altering a shape of the cursor to indicate the second position in response to the receiving of the instruction, wherein the altering of the shape of the cursor comprises extending the cursor from the first position to the second position.

25. A computer program product as recited in claim 24, wherein the altering of the shape of the cursor further comprises contracting the cursor from the first position to the second position after the extending of the cursor.

26. An apparatus comprising:
a display to present electronic content, the display comprising:
a first screen area to present the electronic content, the first screen area having a first refresh rate when altering the presented electronic content;
a second screen area to enable selection of one or more portions of the presented electronic content, the second screen area having a second refresh rate that is different from the first refresh rate, wherein the second screen area enables animation in response to a request to perform an operation on the presented electronic content, and wherein the second screen area includes a selectable marker to enable selection of the one or more portions of the presented electronic content, and wherein the animation comprises moving the selectable marker off of the second screen area; and
an animations module to enable the animation.

\* \* \* \* \*